Dec. 14, 1943.   J. R. MacKAY   2,336,492
PROPORTIONAL CONTROL SYSTEM
Original Filed Dec. 5, 1938   15 Sheets-Sheet 1
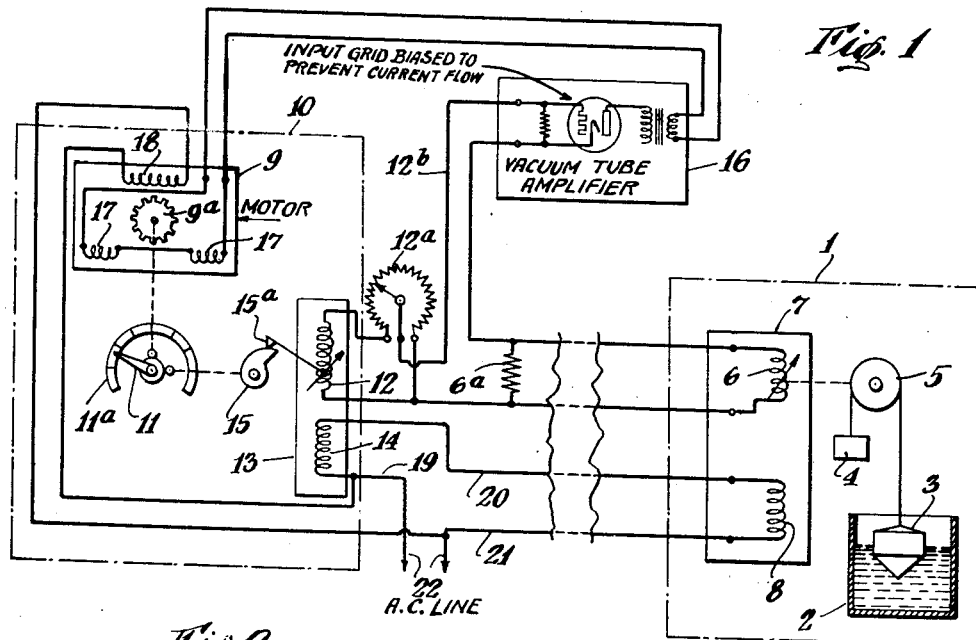
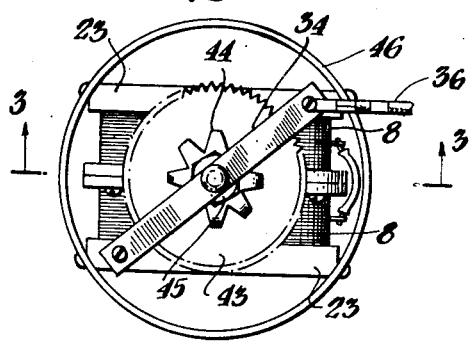
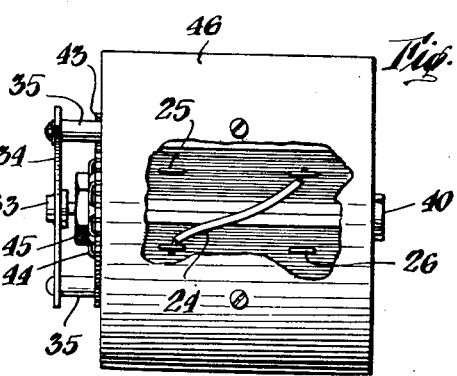
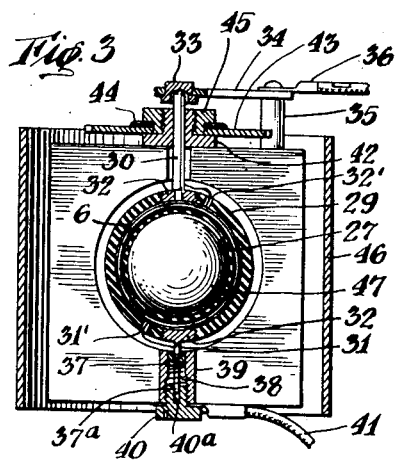
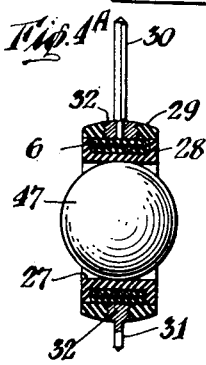
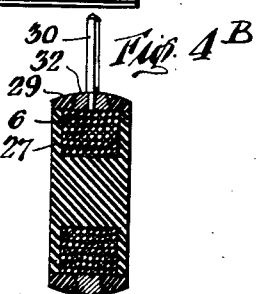

Dec. 14, 1943.   J. R. MacKAY   2,336,492
PROPORTIONAL CONTROL SYSTEM
Original Filed Dec. 5, 1938   15 Sheets-Sheet 2
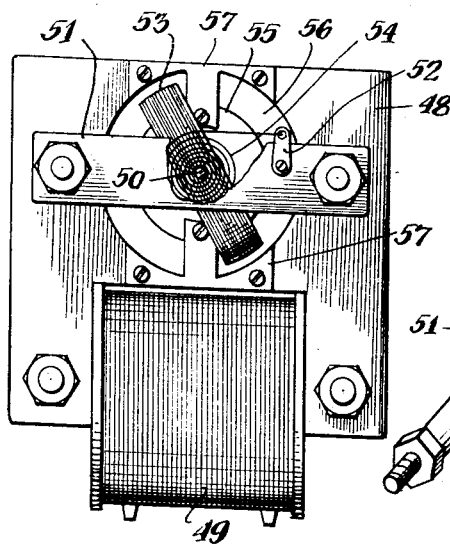
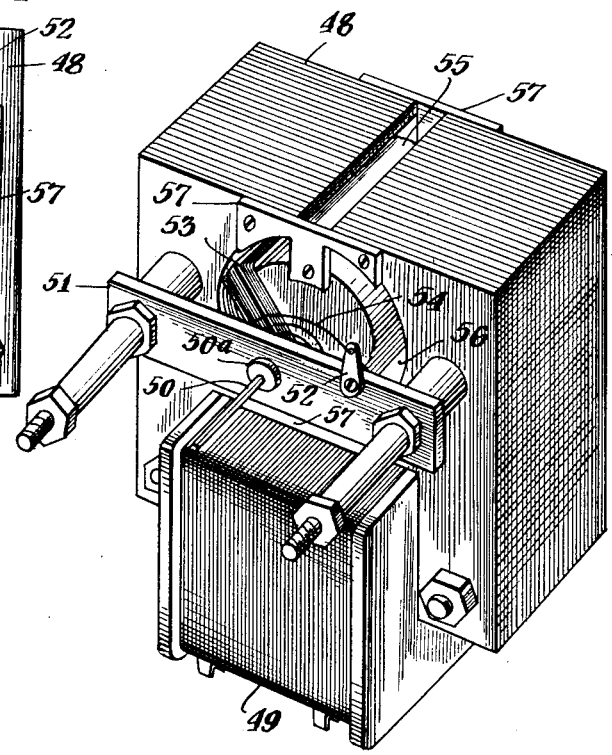
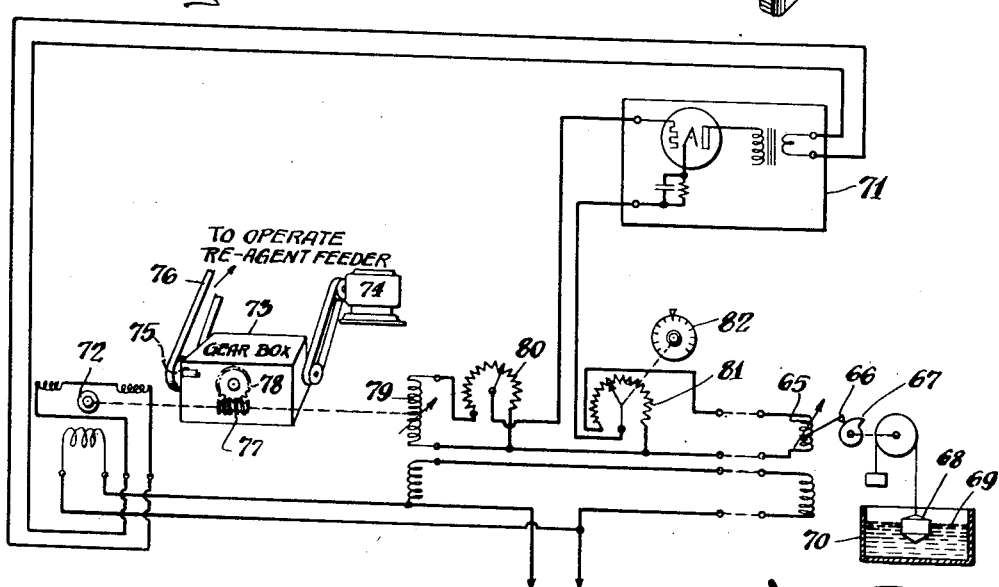

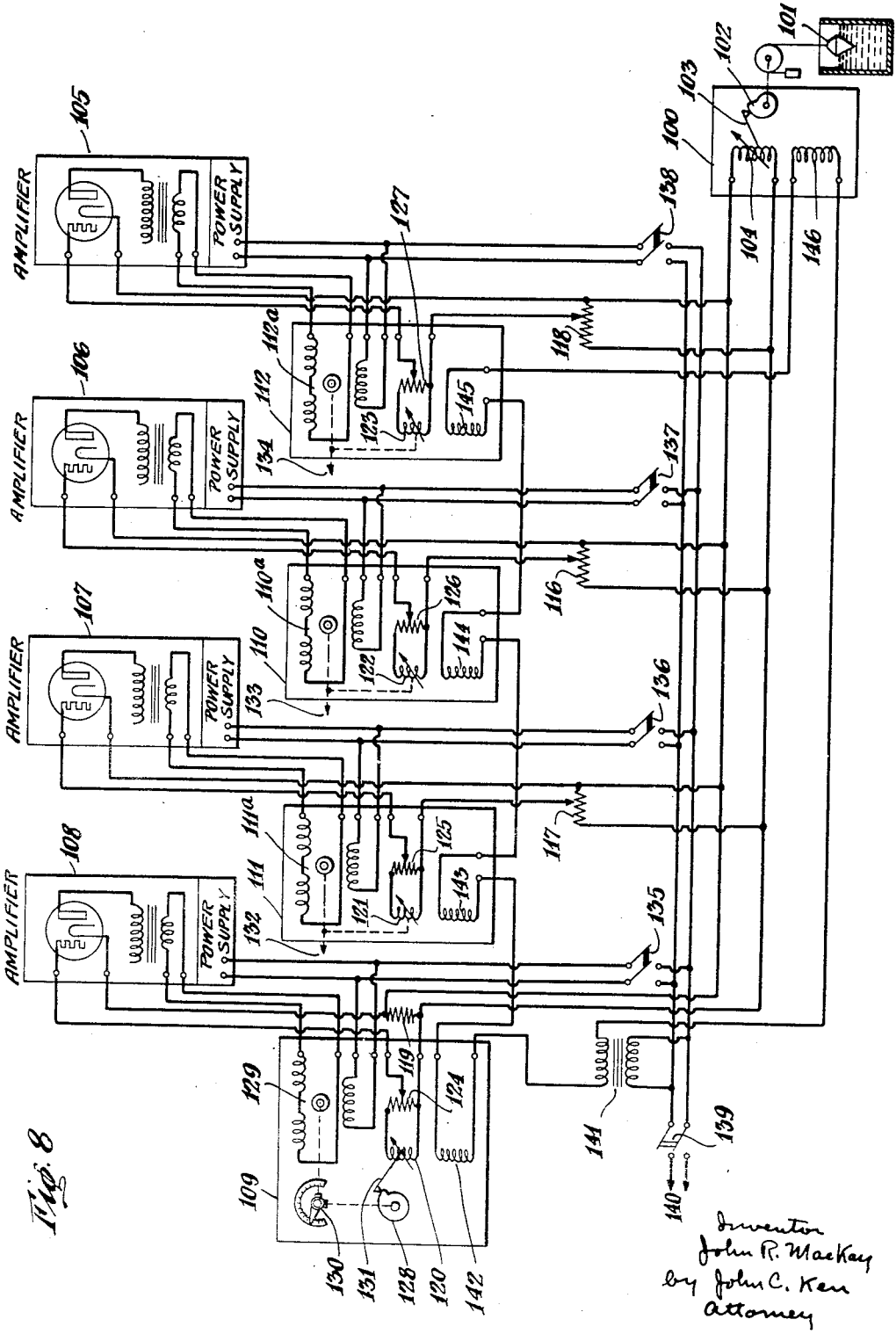
Dec. 14, 1943.  J. R. MacKAY  2,336,492
PROPORTIONAL CONTROL SYSTEM
Original Filed Dec. 5, 1938  15 Sheets-Sheet 3

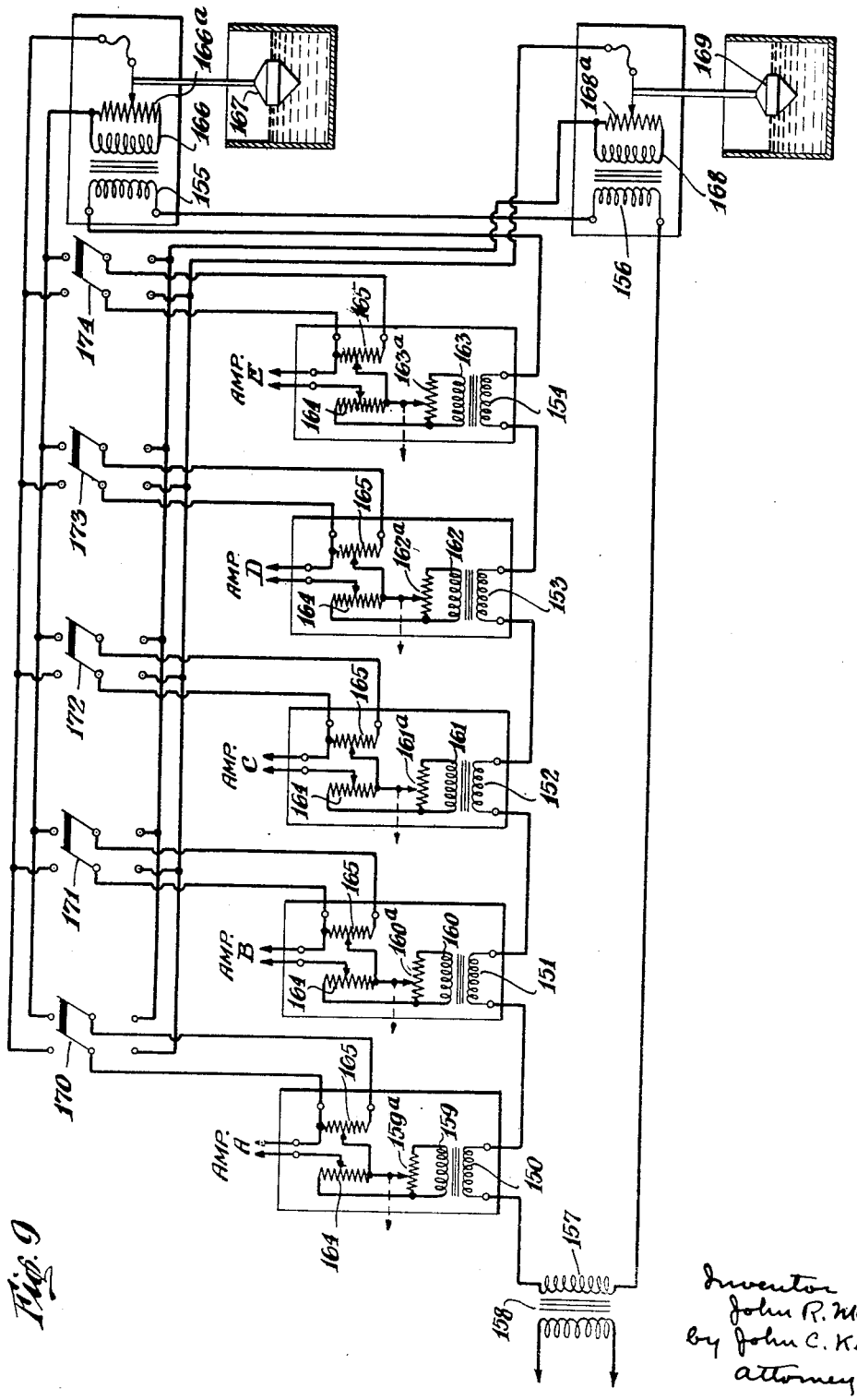

Dec. 14, 1943.    J. R. MacKAY    2,336,492
PROPORTIONAL CONTROL SYSTEM
Original Filed Dec. 5, 1938    15 Sheets-Sheet 5

Inventor
John R. MacKay
by John C. Kerr
attorney

Fig. 12

Dec. 14, 1943.                J. R. MacKAY                2,336,492
                         PROPORTIONAL CONTROL SYSTEM
              Original Filed Dec. 5, 1938    15 Sheets-Sheet 7
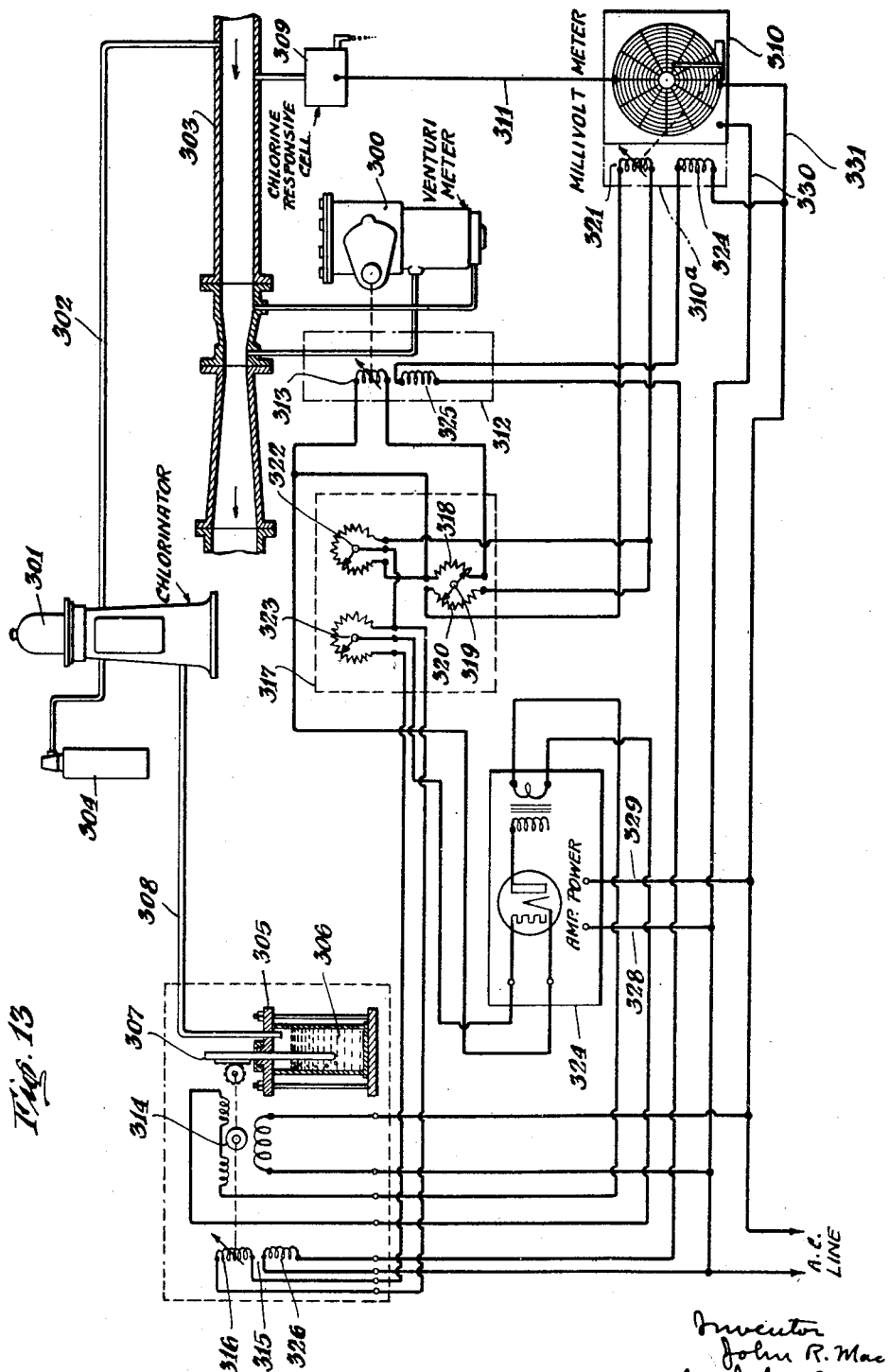

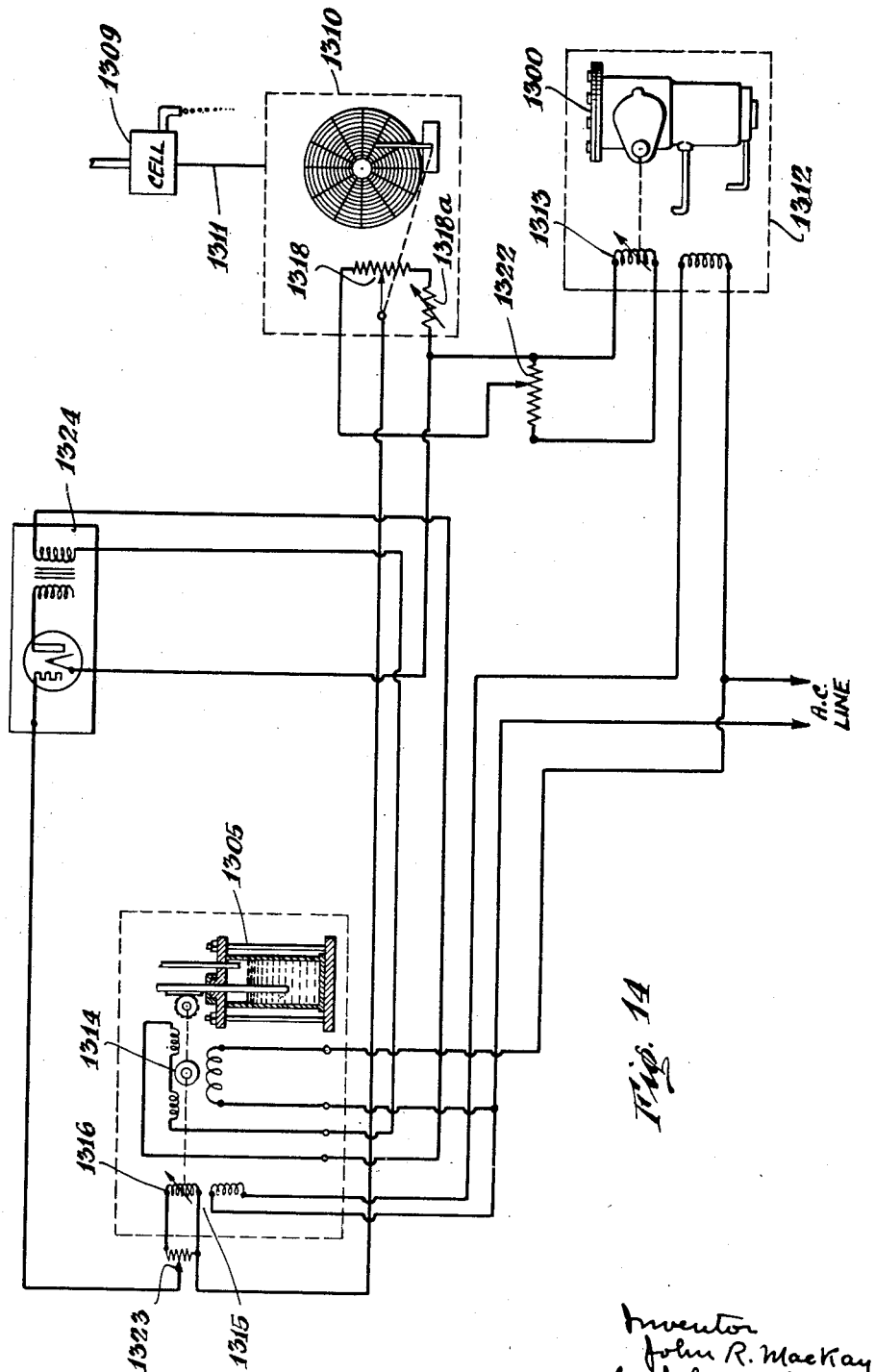

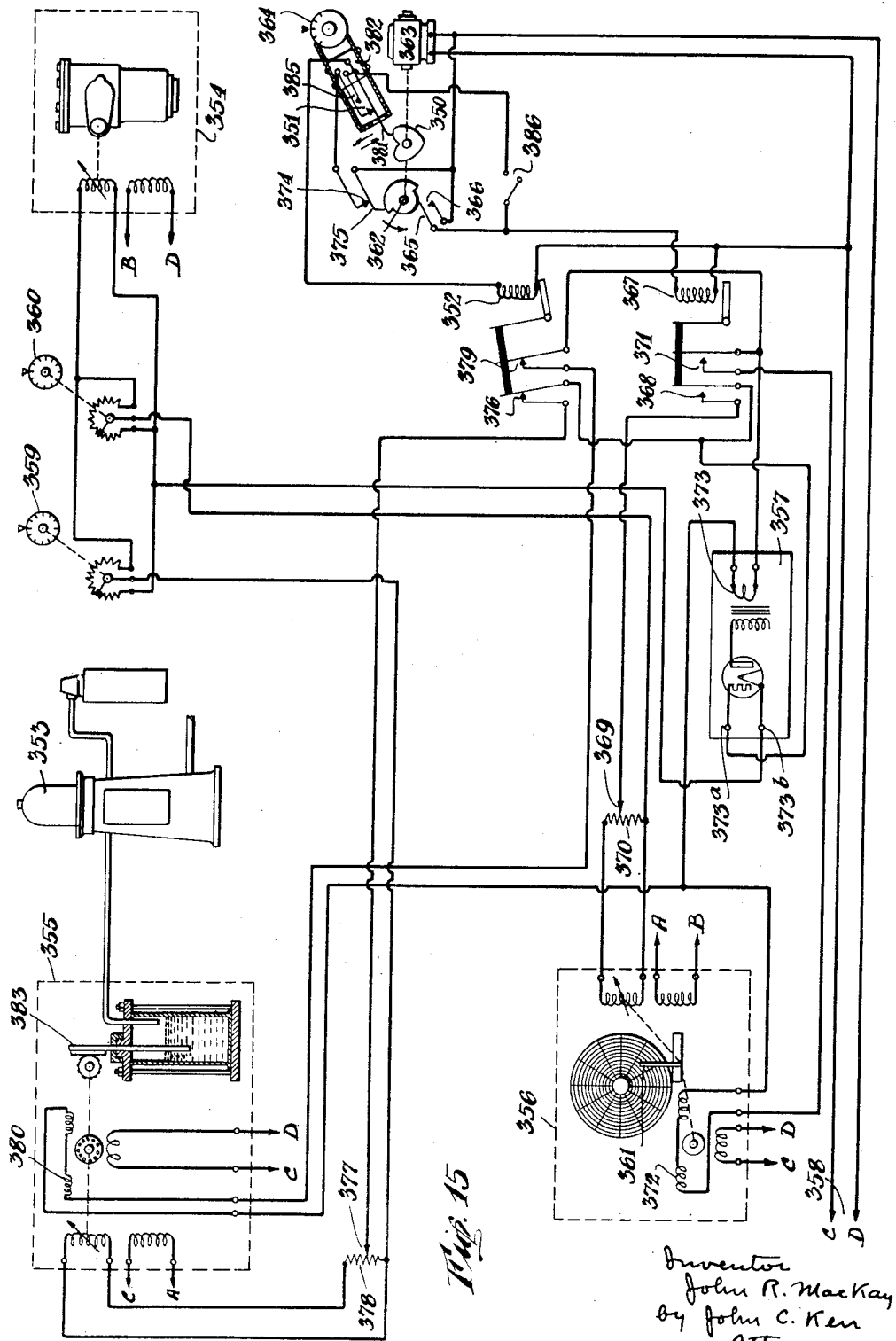

Dec. 14, 1943. J. R. MacKAY 2,336,492
PROPORTIONAL CONTROL SYSTEM
Original Filed Dec. 5, 1938 15 Sheets-Sheet 10

Dec. 14, 1943.     J. R. MacKAY     2,336,492
PROPORTIONAL CONTROL SYSTEM
Original Filed Dec. 5, 1938    15 Sheets-Sheet 11
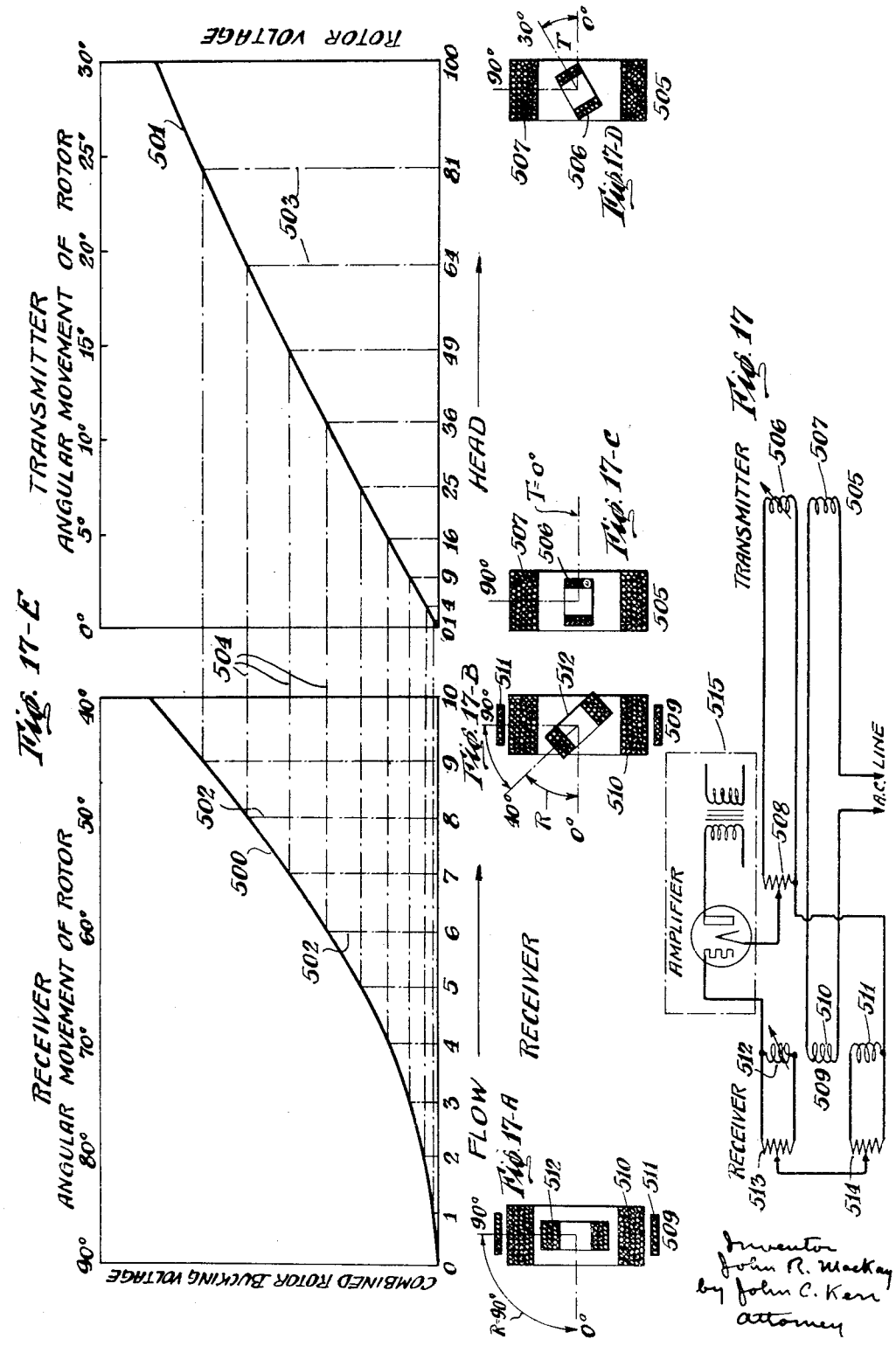

Fig. 17-F

| RECEIVER | | | TRANSMITTER | | | | |
|---|---|---|---|---|---|---|---|
| 1 ANGLE R° | 2 SIN R | 3 1-SIN R | 4 FLOW | 5 HEAD | 6 ANGLE T° | 7 SIN T | 8 $\frac{SIN\ T}{.5000} \times .3572$ |
| 90 | 1.00000 | 0 | 0 | 0 | 0 | 0 | 0 |
| 88 | .99939 | .00061 | .4 | .16 | .048 | .0008352 | .000597 |
| 86 | .99756 | .00244 | .8 | .64 | .192 | .00334 | .002482 |
| 84 | .99452 | .00548 | 1.2 | 1.44 | .432 | .007568 | .005406 |
| 82 | .99027 | .00973 | 1.6 | 2.56 | .768 | .0134032 | .009575 |
| 80 | .98481 | .01519 | 2.0 | 4.0 | 1.2 | .02094 | .014959 |
| 78 | .97815 | .02185 | 2.4 | 5.76 | 1.728 | .0301572 | .021544 |
| 76 | .9703 | .0297 | 2.8 | 7.84 | 2.352 | .0410348 | .029315 |
| 74 | .96126 | .03874 | 3.2 | 10.24 | 3.072 | .0535928 | .03828 |
| 72 | .95106 | .04894 | 3.6 | 12.96 | 3.888 | .0678112 | .04844 |
| 70 | .93969 | .06031 | 4.0 | 16.0 | 4.8 | .08368 | .05978 |
| 68 | .92718 | .07282 | 4.4 | 19.36 | 5.808 | .1011992 | .07229 |
| 66 | .91355 | .08645 | 4.8 | 23.04 | 6.912 | .1206316 | .086179 |
| 64 | .89879 | .10121 | 5.2 | 27.04 | 8.112 | .1411088 | .100808 |
| 62 | .88295 | .11705 | 5.6 | 31.36 | 9.408 | .1634644 | .116778 |
| 60 | .86603 | .13397 | 6.0 | 36. | 10.8 | .18738 | .133864 |
| 58 | .84805 | .15195 | 6.4 | 40.96 | 12.288 | .2128284 | .15204 |
| 56 | .82904 | .17096 | 6.8 | 46.24 | 13.872 | .2340996 | .16724 |
| 54 | .80902 | .19098 | 7.2 | 51.84 | 15.552 | .2681136 | .19154 |
| 52 | .78801 | .21199 | 7.6 | 57.76 | 17.328 | .2978404 | .21277 |
| 50 | .76604 | .23396 | 8.0 | 64. | 19.2 | .32887 | .23494 |
| 48 | .74314 | .25686 | 8.4 | 70.56 | 21.168 | .3611010 | .257969 |
| 46 | .71934 | .28066 | 8.8 | 77.44 | 23.232 | .3944584 | .28180 |
| 44 | .69466 | .30534 | 9.2 | 84.64 | 25.392 | .4288104 | .30634 |
| 42 | .66913 | .33087 | 9.6 | 92.16 | 27.648 | .4640386 | .331508 |
| 40 | .64279 | .35721 | 10.0 | 100.0 | 30.0 | .50000 | .35720 |

Dec. 14, 1943.  J. R. MacKAY  2,336,492
PROPORTIONAL CONTROL SYSTEM
Original Filed Dec. 5, 1938  15 Sheets-Sheet 13
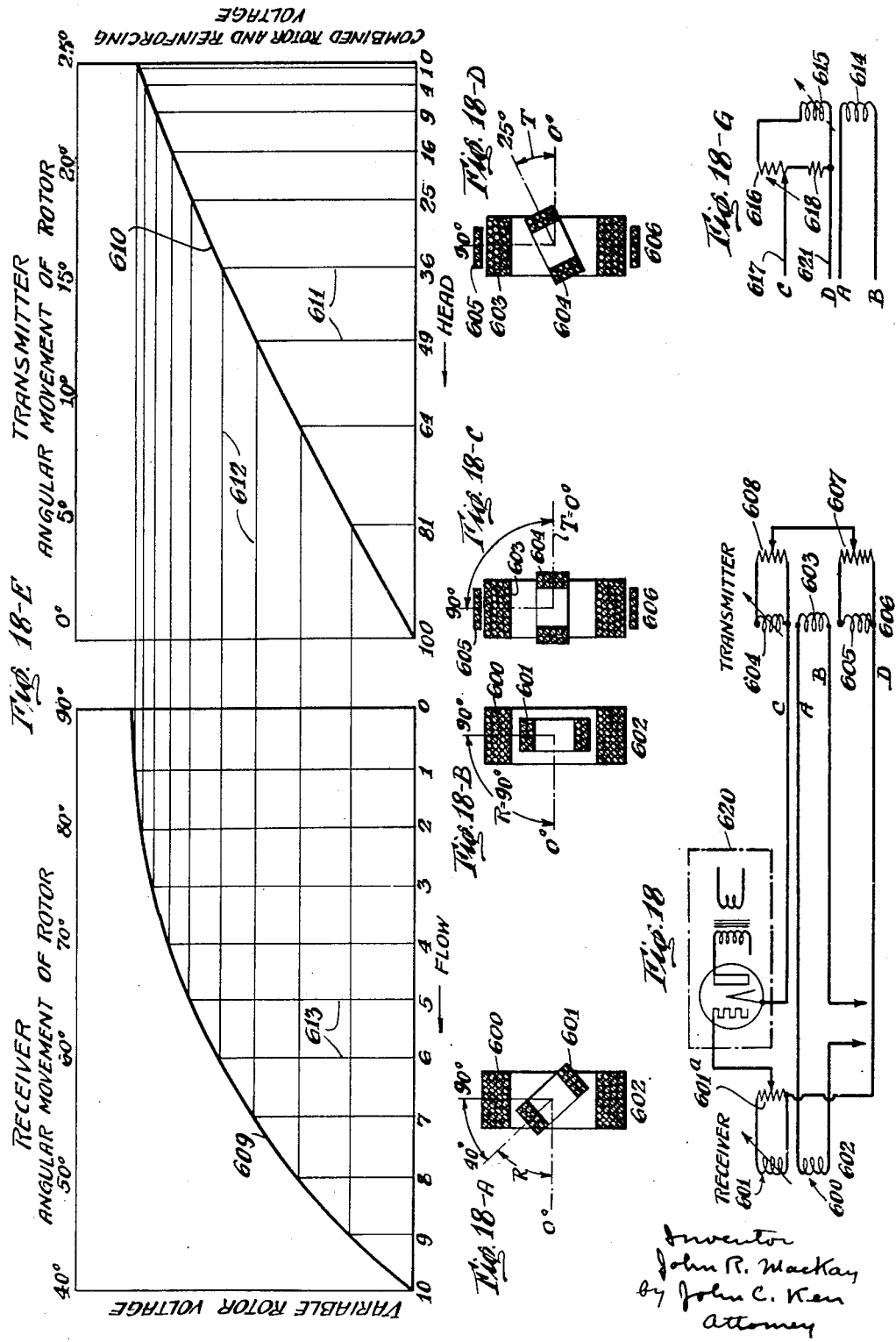

Fig. 18-F

| RECEIVER | | TRANSMITTER | | | | |
|---|---|---|---|---|---|---|
| 1 ANGLE R | 2 SIN R | 3 FLOW | 4 HEAD | 5 ANGLE T | 6 SIN T | 7 $\frac{.3572 \times SIN T}{.4226} + .6428$ |
| 90 | 1 | 0 | 0 | 25 | .42262 | 1.00000 |
| 88 | .99939 | .4 | .16 | 24.96 | .42198 | .999418 |
| 86 | .99756 | .8 | .64 | 24.84 | .42011 | .997868 |
| 84 | .99452 | 1.2 | 1.44 | 24.64 | .41691 | .997868 |
| 82 | .99027 | 1.6 | 2.56 | 24.36 | .41246 | .995163 |
| 80 | .98481 | 2.0 | 4.0 | 24.0 | .4067 | .99140 |
| 78 | .97815 | 2.4 | 5.76 | 23.56 | .39997 | .98653 |
| 76 | .9703 | 2.8 | 7.84 | 23.04 | .39137 | .980843 |
| 74 | .96126 | 3.2 | 10.24 | 22.44 | .38169 | .97357 |
| 72 | .95106 | 3.6 | 12.96 | 21.76 | .37072 | .96539 |
| 70 | .93969 | 4.0 | 16.0 | 21.0 | .35837 | .95611 |
| 68 | .92718 | 4.4 | 19.36 | 20.16 | .34464 | .94563 |
| 66 | .91355 | 4.8 | 23.04 | 19.24 | .32953 | .93107 |
| 64 | .89879 | 5.2 | 27.04 | 18.24 | .31300 | .92129 |
| 62 | .88295 | 5.6 | 31.36 | 17.17 | .29526 | .907328 |
| 60 | .86603 | 6.0 | 36.0 | 16.0 | .27564 | .89230 |
| 58 | .84805 | 6.4 | 40.96 | 14.76 | .25477 | .87574 |
| 56 | .82904 | 6.8 | 46.24 | 13.44 | .23243 | .858106 |
| 54 | .80902 | 7.2 | 51.84 | 12.04 | .20860 | .83922 |
| 52 | .78801 | 7.6 | 57.74 | 10.57 | .18344 | .819078 |
| 50 | .76604 | 8.0 | 64.0 | 9.0 | .15643 | .79781 |
| 48 | .74314 | 8.4 | 70.56 | 7.36 | .12810 | .77498 |
| 46 | .71934 | 8.8 | 77.44 | 5.64 | .09828 | .751032 |
| 44 | .69466 | 9.2 | 84.64 | 3.84 | .06700 | .725825 |
| 42 | .66913 | 9.6 | 92.16 | 1.96 | .03417 | .69938 |
| 40 | .64279 | 10.0 | 100.0 | 0. | 0. | .64279 |

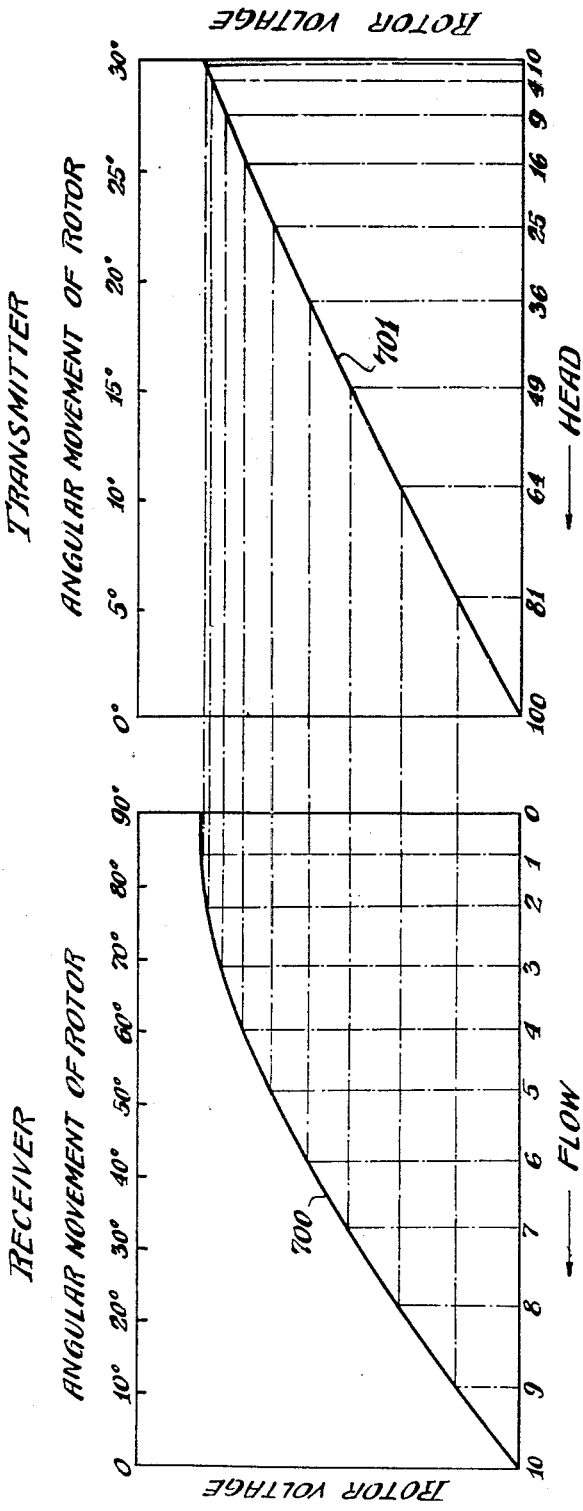

Patented Dec. 14, 1943

2,336,492

UNITED STATES PATENT OFFICE 2,336,492

PROPORTIONAL CONTROL SYSTEM

John R. MacKay, West Caldwell, N. J., assignor to Wallace & Tiernan Products, Inc., Belleville, N. J., a corporation of New Jersey Original application December 5, 1938, Serial No. 244,054. Divided and this application December 26, 1939, Serial No. 311,035

15 Claims. (Cl. 172—239)

This invention relates to proportional control systems and procedure, particularly of the electrical type, whereby one or more elements or quantities are to be controlled in proportion to variations of one or more master elements or quantities. An important object of the invention is to provide a new and improved system including transmitting and receiving stations, wherein the control at the receiving station may be exercised continuously and with practically instantaneous response to changes at the transmitting station, and wherein the principal control circuit is substantially free of current flow at all times, so as to prevent reaction back from a controlled to a controlling instrument, and so as to cooperate in the attainment of a number of other objects and advantages hereinafter apparent, or incidental to practical applications of the invention. Another important object is to provide improved electrically operated control systems which are readily adapted to a wide variety of metering, telemetering, and remote control purposes; and to provide systems of the character described, which are substantially unaffected by changes in temperature, power line voltage, and the like.

Further objects of the invention are to provide electrical control systems for operating chemical feeders, chlorinators, recorders and like devices in proportion to the flow of a fluid such as water or sewage, or other substance being handled or treated, and/or in proportion to chemical or other properties of the fluid or other substance, wherein greater accuracy, sensitivity and reliability are obtained than in prior systems; wherein there is less frictional or other load on delicate controlling or controlled devices; wherein there may be no necessity for the use of synchronous motors or other synchronizing devices at both the transmitting and the receiving points, such as required in some prior systems; and wherein there may be included a variety of special, multiple or composite features of control, which are unobtainable or unsatisfactory in systems heretofore available.

Other objects are to provide new and improved instrumentalities and combinations thereof, in and for systems of the character described, including arrangements for readily matching a receiving device to a specific transmitting condition; for effecting secondary proportioning or "dosage" control—e. g., in proportionally controlled feeding devices, varying the amount of substance fed per unit quantity of treated material; for effecting similar secondary control according to an automatic program, or automatically in proportion to other variables as well as in proportion to the master or principal variable, or automatically to decrease the rate of receiver response (whereby fluctuation or hunting is minimized, when it might otherwise exist); for efficiently interrelating a plurality of controlled or controlling devices or both (while separately effecting various secondary controls, as desired); and for producing, in a simple manner and without the use of cams or like compensating devices, a linear or substantially linear response to a non-linear control variable such as a control meter operating in proportion to the square of the quantity primarily concerned.

Other objects and advantages of the invention, relative to procedure and apparatus whereby greater simplicity, economy and efficiency may be obtained in proportional control apparatus, and whereby various further controls of special advantage may be afforded, will be hereinafter stated or apparent in connection with the following description and accompanying illustration of certain presently preferred embodiments of the invention, set forth by way of example.

In the drawings, which are wiring diagrams of control systems unless otherwise noted:

Fig. 1 shows a proportional control system for operating an indicator from a flow-responsive transmitter;

Fig. 2 is a plan view of an inductor suitable for use in the systems of the invention;

Fig. 3 is a section on line 3—3 of Fig. 2;

Fig. 4 is an elevation, partly broken away, of the inductor of Figs. 2 and 3;

Figure 10:
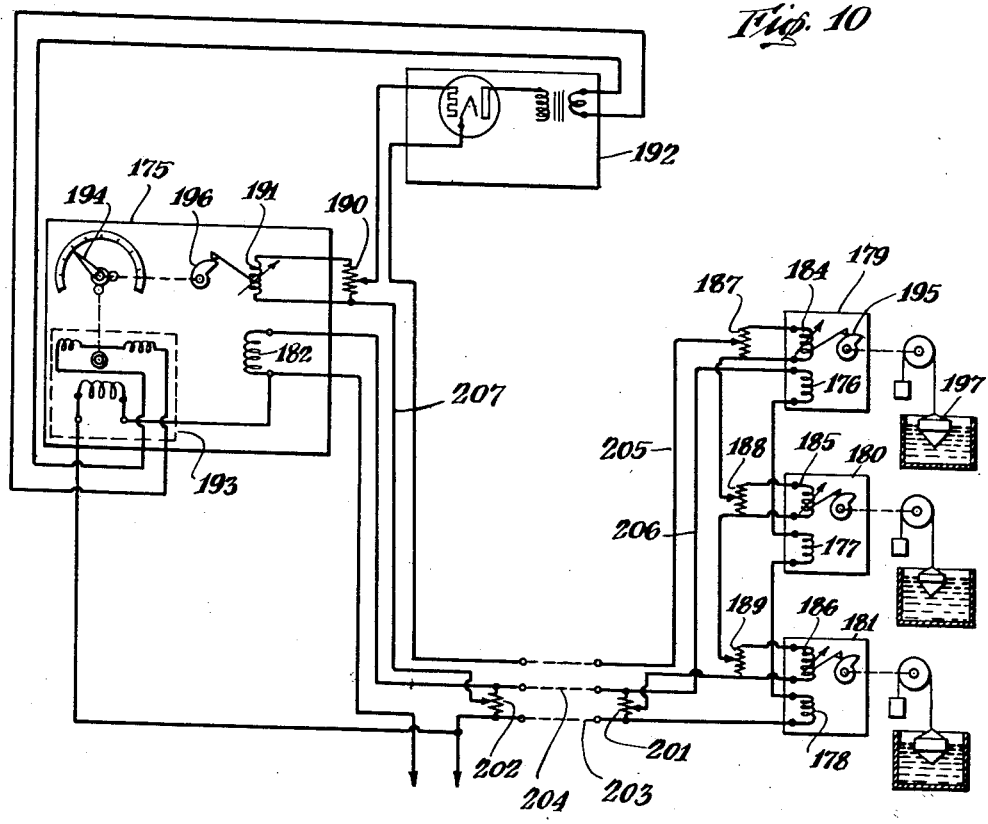
Figure 11:
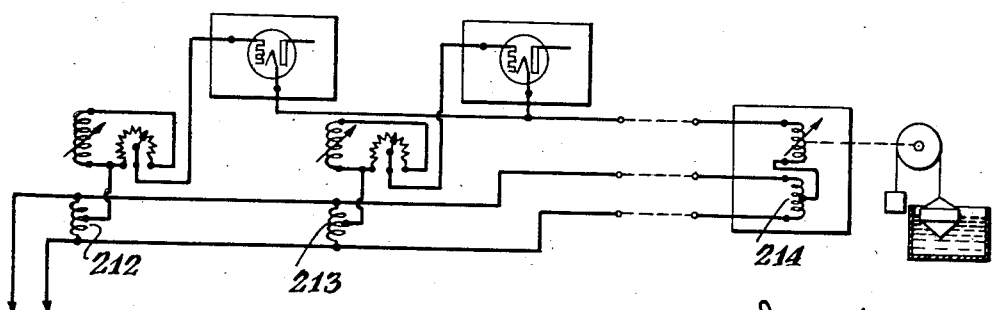

Fig. 4—A is a side view, partly in section, of the rotor of the device in Fig. 3; Fig. 4—B showing an alternative rotor;

Figs. 5 and 6 are respectively elevation and perspective views of another structure of inductor;

Fig. 7 is a modification of the system of Fig. 1, including secondary proportioning means;

Fig. 8 is a further modified proportional control system, including a plurality of controlled devices;

Fig. 9 is another modified system, with selectable controlling and controlled devices and a modified structure of such devices;

Fig. 10 is another modification including a plurality of transmitters exercising joint control;

Fig. 11 shows a modification of certain simplified connections illustrated in Fig. 10;

Figure 12:
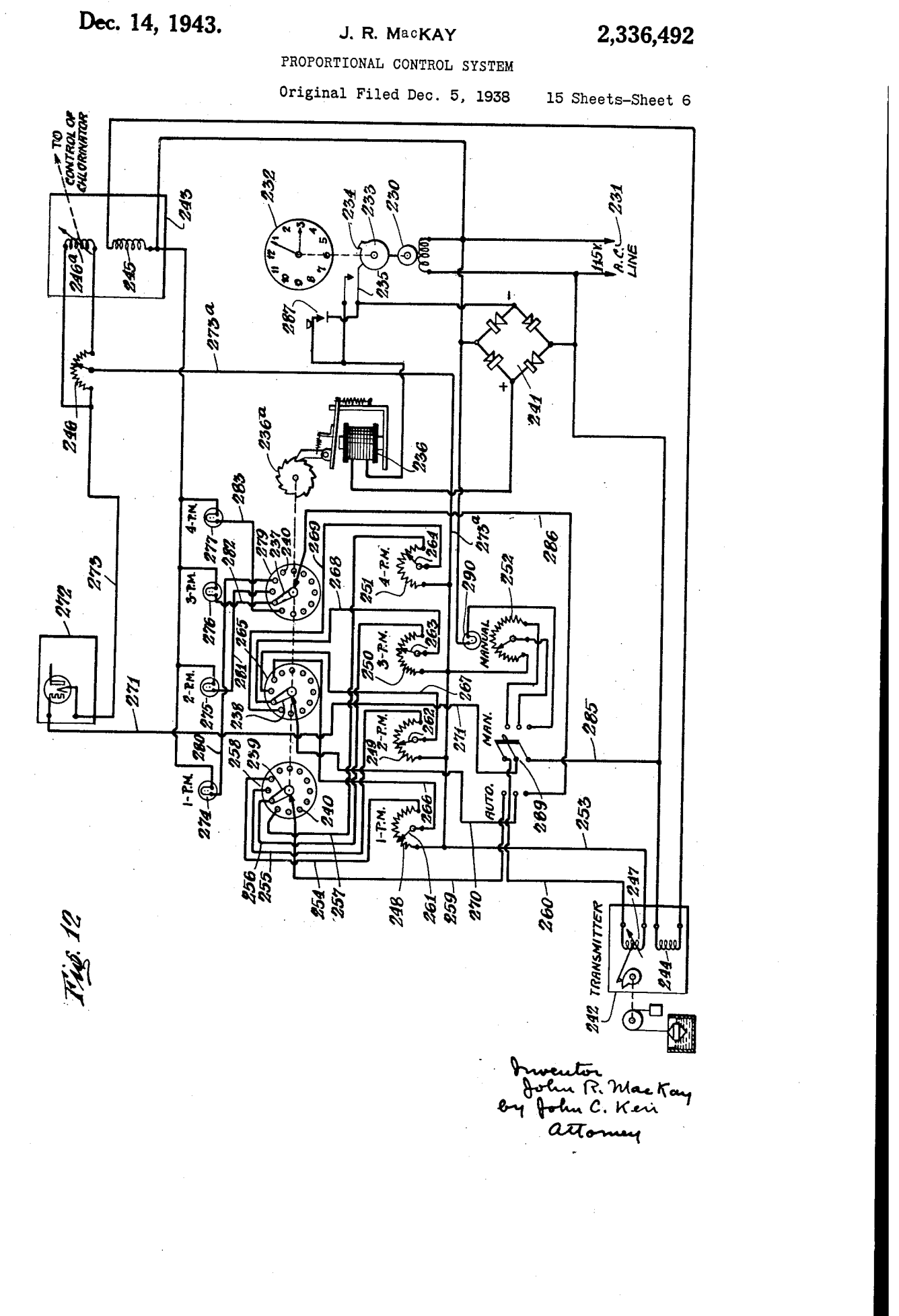

Fig. 12 is another system providing for an automatic program of secondary proportioning or "dosage" control;

Fig. 13 is another system for controlling a chemical feeder automatically in accordance with both the flow and chemical nature of the treated material;

Fig. 14 is a modification of certain controlling arrangements in Fig. 13;

Fig. 15 is a further system wherein a single amplifier is used for a plurality of controlled devices, and wherein the rate of response of a controlled device can be slowed down as desired;

Fig. 16 is another system, wherein the flow-responsive control of a feeder is checked against the rate of feed of the latter;

Fig. 17 is a modified system for producing a linear response to a non-linear control;

Figs. 17—A to D inclusive are sections of control instruments used in Fig. 17, in various positions;

Fig. 17—E is a graphic representation of the operation of the devices shown in Figs. 17 to 17—D;

Fig. 17—F is a table indicating the relation of various numerical quantities entering into the operation of the devices shown in Figs. 17 to 17—D;

Figs. 18, and 18—A to F inclusive respectively correspond to Figs. 17 and 17—A to F inclusive, and similarly illustrate a modification of the arrangements illustrated in the last-mentioned figures;

Fig. 18—G is a fragmentary view showing a further modification of part of the circuit shown in Fig. 18; and Fig. 19 is a graphic representation of the operation of systems such as illustrated in Fig. 7, under certain conditions.

Attention is first directed to Fig. 1 of the drawings, which illustrates certain important features of the invention, relating to systems for automatic proportioning and control. A flow type of transmitter generally designated 1 is arranged for response to the vertical movement of the liquid in a float chamber 2. Such chamber may, for example, be a weir box of well known construction, wherein the movement of a float 3 bears a definite exponential relation to the flow of liquid through a notch or orifice on the weir. Vertical movement of the float 3, facilitated by its counterweight 4, causes rotation of the pulley 5, to the shaft of which, and through the medium of suitable gears or other coupling means, is attached the rotor 6 of the inductor 7; the rotor being suitably journaled for rotation with respect to its stator winding 8.

The circuit of the transmitting inductor 7 extends to certain receiving instrumentalities, among which there is diagrammatically shown a relatively simple indicating device 10, comprising a shaded pole motor 9 which has its rotor 9a geared to or otherwise arranged to drive an indicator pointer 11 traversing a scale 11a. The pointer 11 is itself geared or otherwise arranged to rotate positively a cam 15 which in turn, by means of the follower arm 15a, revolves the rotor 12 of a receiving inductor 13, relative to the stator winding 14 of the latter. The cam 15 is provided so that it may convert the movement of the float 3, which is non-linear with respect to the rate of flow of the liquid, into a substantially uniform or linear movement of the pointer 11, in the course of operation of the apparatus as hereinafter described.

An amplifier 16 which may comprise one or more voltage amplifier stages followed by a power amplifier stage is provided for energization of the opposed shading coils 17, 17, of the motor 9. Suitable amplifiers of the type mentioned are well known, and thus for convenience of illustration, in this and other figures, the amplifier is simply indicated with a representation of a single vacuum tube and transformer. For like reason, a simplified representation of a shading coil motor, as at 9, has been employed in the several drawings, omitting the core and showing only two shading coils, instead of four or more as would preferably be employed.

Suitable amplifier-controlled shading coil motor apparatus of this type is described in my copending application Serial No. 74,895, filed April 17, 1936 for Motor control apparatus, to which reference may be had for a full description of such apparatus. In brief, the motor 9 has a field winding 18 connected across an alternating current line 22, and has a plurality of shading coils 17, each of which is wound with a multiplicity of turns. The shading coils are normally opposed in electrical effect, so as to keep the rotor 9a stationary when no external current is applied to them, but they are so connected (advantageously in series) to the secondary of the output transformer of amplifier 16, that in accordance with the phase relationship between the alternating current in the amplifier output and that from the line 22, the electromotive forces normally induced in one shading coil (or set of coils, if more than two coils 17 are used) are assisted and the electromotive forces normally induced in the other shading coil (or set of coils) are opposed and preferably overcome, by the electromotive force set up in the amplifier output, whereby rotation of the rotor is produced in one direction or the other depending on the phase relation between the current from line 22 and that from the amplifier output. The existence and phase relation of an alternating voltage at the amplifier output are dependent upon the existence and phase relation of such voltage across the amplifier input; and as will be apparent from the description of the other apparatus, the latter voltage, when it appears, will be approximately in phase or 180° out of phase with the voltage of line 22, so that the motor 9 will be caused to operate in one direction or the other.

Although I at present generally prefer to use motor apparatus of the type described in the aforesaid application Serial No. 74,895, since it requires little amplifier output for its positive operation, is essentially non-hunting, and is extremely sensitive to changes of voltage and phase, other types of motors or actuating devices may be satisfactorily used—for example, instrumentalities similar to the amplifier-controlled galvanometer apparatus employed to operate a potentiometric device in Figs. 14 and 15 of my copending application Serial No. 210,984, filed May 31, 1938, for Voltmeter apparatus.

The rotor windings 6 and 12 of the transmitting and receiving inductors 7 and 13 respectively are preferably connected in series with the input of the amplifier 16, as shown, so that alternating electromotive force will only be impressed on the input of the amplifier when the voltages produced by the opposed windings 6 and 12 are unequal.

In the specific example of Fig. 1, the series connection through the receiving rotor 12 is effected across a potentiometer 12a for purposes hereinafter explained, but for simplicity of description it may be temporarily assumed that the potentiometer is omitted and the amplifier input lead 12b connected directly to the upper side of the rotor winding 12.

The stator windings 8 and 13 of the respective inductors are conveniently connected for energization from the alternating current line 22, and are preferably connected in series opposition, as by means of conductors 19, 20 and 21, in the manner illustrated in Fig. 1. By virtue of this arrangement fluctuations in line voltage will affect both inductors in a similar manner and automatic compensation will also be afforded for differences in temperature between the locations of the receiving and transmitting instrumentalities, since any change in the resistance of the copper stator windings due to temperature will result in a change in the current through both of the inductor stators and will thus produce no change in their ampere-turn relationship. This feature is of particular value in water works installations and the like, where the temperature of the transmitter will usually follow variations in climatic and water temperatures, while the receiving apparatus will usually be located in a protected and heated structure and thus have a relatively stable and constant temperature.

From the preceding description it will now be appreciated that if suitable alternating current is applied to the line terminals 22 a voltage will be produced in the rotor windings 6 and 12. If these windings and the windings 8 and 13 of their respective stators are alike, the voltages will be equal in value and opposite in phase, providing the angular positions of the rotors are similar; and no electromotive force will then be impressed on the input of the vacuum tube amplifier 16. If, however, the angular position of one rotor should differ from that of the other, an alternating E. M. F. of an amplitude proportional to the extent of the difference, and of phase corresponding to the direction of the difference, will be impressed on the input to the amplifier 16, whereby the amplifier will effect energization of the shading coils 17 of the motor 9 and operate the motor, in such a manner as to restore balance between the inductors. When the receiver rotor 12 has thus been moved to the new position of balance with transmitter rotor 6, the motor will again come to rest.

It will now be seen that the described apparatus provides not only a simple and reliable proportional movement system but also a system that is fully compensated for both voltage and temperature. Of special importance, moreover, is the fact that no appreciable reaction is produced on the transmitter 1 by the receiving rotor 6, since the rotors 6 and 12 are connected in series with the grid circuit of the first voltage amplifier stage of amplifier 16, and since that amplifier stage may preferably be operated with sufficient "C" bias (e. g., negative grid bias) to prevent any flow of grid current at any time, so that no current flows in the windings 6 and 12 at any time and no electromagnetic reaction can result. Furthermore, since there is preferably never any flow of current in these windings, any variation in their resistance, due to temperature changes, has no effect on their voltage.

Although in a number of cases the system may be used without such means, the inclusion of the potentiometer 12a in the circuit across the receiving rotor 12, makes it possible to increase or decrease the amount of angular movement of rotor 12 and associated pointer 11 which will correspond to any given amount of rotation of the transmitter inductor rotor 6. It may be explained that it is often impractical, from a mechanical and commercial standpoint, to design and construct a recorder which will exactly match a particular transmitter condition—for example, because the parts have to be standardized for manufacture in quantity, or because field data concerning flow, pressures, and the like are often inaccurate by reason of a lack of suitable facilities for their close determination. In such cases, the illustrated circuit is of special advantage, in that the potentiometer 12a spreads or contracts the range of response of the receiving apparatus and allows the receiver to be accurately matched to the transmitter at the time of installation.

Thus, for example, if the voltage output of the transmitter rotor 6 is 30 volts when it has been moved to a predetermined position, which for purposes of illustration may be taken as a deflection of 30 from zero position, and which may correspond, say, to the maximum flow position of the float 3, it will be necessary for the rotor 12 to turn through a greater angle in order to produce the same voltage between one side and the center arm of the potentiometer 12a, so that balance can be established and the motor 9 brought to rest in the manner previously explained. That is, other things being equal, the rotors 6 and 12 being themselves identical in actual voltage output for the same relative positions, and the potentiometer arm being set at a selected intermediate point, the receiver rotor 12 will not stop at the same angle as the transmitter, but must move to a greater angular position (i. e., a position of closer inductive coupling)—since only such part of the receiving rotor voltage as is proportioned by the potentiometer 12a is applied in opposition to the voltage generated by the transmitting rotor 6.

Hence it will be seen that the range of movement of the indicator arm 11 can be amplified or "spread," by moving the arm of the potentiometer 12a in a clockwise direction (as viewed in the drawing). In most instances of the system shown, moreover, the transmitting and receiving inductors are preferably so wound or otherwise constructed or arranged relative to each other, that the voltage of the transmitting inductor rotor at its highest available angular position is somewhat less than that of the receiving inductor rotor for the same angular position, so that the range of the indicator arm 11 can be either increased or decreased, by adjustment of the potentionmeter arm one way or the other from a determinable position of voltage equality. This basic voltage relation of the inductor rotors is indicated, for example, in Figs. 1 and 7 (hereinafter described) by a larger number of turns on the receiving rotor than on the transmitting rotor.

For best results in many cases where a resistance such as potentiometer 12a is connected across the receiver rotor 12, a corresponding resistance such as the fixed resistor 6a may be connected across the transmitter rotor 6, to obtain optimum phase relationship between the inductors.

It will be understood that although the motor 9 is shown connected to drive an indicator pointer, it may in addition or instead be arranged to operate or control one or more other devices, such as recorders, liquid or dry chemical feeders, or the like, and that although the transmitting inductor is controlled by a flow-responsive float, it may be operated by other devices responsive to the variation of a quantity for which proportional control is desired; the same being generally true of other systems of the invention hereinafter described.

Figs. 2, 3, 4 and 4—A illustrate a satisfactory form of inductor for use in the circuit of Fig. 1 and in other circuits hereinafter described. In this inductor structure, the stator winding 8 is supported on a split form 23 of insulating material such, for instance, as molded Bakelite. By making the stator in two sections the rotor can be installed with only the slightest dismantling of the associated parts. A wire 24 connects the two stator halves in series so that they are in electrical effect a single winding, as represented in Fig. 1; terminals 25 and 26 being provided for making connections to the ends of the winding.

The rotor winding 6 is supported on a ring-shaped core 27, preferably of insulating material, and is conveniently contained in an annular groove 28 molded or machined in the core. A ring of insulating material 29, concentric with the core and closely fitting it, is pressed in place around and over the rotor winding, as shown, so as to provide both a protection for the latter and a means for the support of the shaft 30 and the pivot 31. Glyptol lacquer, or like sealing material, may be used for impregnation of the windings 6 and 8 and for the production of a moisture tight seal between the ring 29 and the core 27.

The shaft 30 and pivot 31, for supporting the rotor are conveniently pressed into insert members 32, which are molded or screwed in the Bakelite ring 29 so that a strong and secure anchorage is obtained. Respectively adjacent the inserts 32, small holes 32' and 31' are provided in the ring 29, and the ends of the winding 6 extend out through the holes and are soldered to the inserts, respectively, so that electrical connection to the winding can be made through the shaft 30 and pivot 31.

The end of the shaft 30 seats against a pivot bearing 33 of hardened conducting material, such as heat treated beryllium copper, which is carried by a metal arm 34 supported on the insulated stator form 23 by the bushings or studs 35. This provides both a well insulated bearing and at the same time acts as a terminal for attaching a connecting wire 36.

The pivot 31 is seated in a thrust bearing 37 of heat treated beryllium copper (or like material) which is urged against the pivot by the coil spring 38, as shown. The bearing and spring are housed in a metal container 39 which is clamped in position between the two halves of the stator forms 23. A retaining screw 40 keeps the spring 38 under compression and also has a tubular recess 40a in which a pin 37a, comprising an extension of bearing 37, is slidably guided. The screw 40 provides a means for attachment of the connecting wire 41.

A collar 42 is pressed on the shaft 30 and serves as a support for the drive gear 43 which is preferably made from Bakelite or other insulating material. The gear 43 is forced into frictional contact with the collar 42 by the friction spring or spider 44, so that the gear can be used to rotate the shaft 30 and the rotor assembly. A nut 45 retains the spring 44 in engagement with the gear, which otherwise would be free to rotate on the collar 42 about the axis of the shaft 30. It will be understood that the frictional connection of the gear 43 is such that the rotor may be displaced or adjusted relative to the gear—for example, by manually turning the core 27 while holding the gear.

In order to prevent the induction of electromotive forces in the rotor by magnetic fields which are produced by motors or other equipment often associated with the inductor devices, a cylindrical shield 46 of ferrous material is placed completely around the inductor assembly, coaxially with the shaft 30. Particularly in instances where the inductor may be mounted in a recorder case or other container made from a ferrous material and where relative movement between the inductor and casing structure may occasionally take place (as upon opening the case to take readings or to inspect or adjust other devices), it is often desirable to enclose the ends of the cylindrical shield 46 with end plates (not shown), likewise of iron or other ferrous material. Such construction eliminates errors due to induction or to the increase and decrease of inductance that would otherwise exist when the distance between the inductor device and the iron recorder or motor casing is varied.

Ordinarily air-core inductors (i. e., having a core of air or other non-magnetic material) are at present preferred, as affording maximum accuracy and uniformity of response; and Fig. 4—B illustrates a rotor suitable for use in the inductor of Figs. 2, 3 and 4 (instead of the rotor actually shown in Figs. 3 and 4—A), so as to constitute an air-cored device. However in certain cases, the rotor may be as shown in Figs. 3 and 4—A, wherein the rotor winding support 27 has a large central opening into which a soft iron ball 47 is cemented or otherwise fastened, with its center on the axis of shaft 30 and pivot 31. This spherical ball constitutes an iron core and as a result a greater number of magnetic lines of force traverse the winding 6, which in turn produces an increased voltage output and has a greater sensitivity to angular movement.

Since in many instances the angular position that the rotor will be required to assume will be different from that of the rotor in the controlled or receiving unit (for example, where secondary proportioning is employed, as in systems hereinafter described), it is extremely desirable that there be no appreciable phase shift other than a shift of 180°, at any time, and that apart from a phase shift of 180°, there be merely a change in the magnitude of the two voltages. That is, for instance, if the entire rotor core 27 were made from iron or other magnetic material having an annular groove cut into it to receive the rotor winding, the non-symmetrical shape of the core would occasion considerable phase shift as the rotor is turned. However, by using the spherical core 47 (or by the use of an air core) the relation between the stator winding and the core remains constant for all positions of the rotor and no shift in phase occurs to reduce the sensitivity of the inductor to small angular changes.

Figs. 5 and 6 illustrate an alternative inductor construction which is highly efficient, which also does not appreciably change its phase angle as it moves through an arc of 180°, and which is especially adaptable to long distance transmission where line voltage losses should preferably be kept down, as by the use of low current devices.

The device of Figs. 5 and 6 includes a field core structure 48 of laminated iron or steel, which is magnetically energized by the stator winding 49, as shown. A rotor winding 53 wound on a light metal or Bakelite form has outwardly-extending supporting shafts or pins 50 which are journaled in the bearings 50a, the latter being mounted on the insulating strips 51 which may also serve as a mounting for terminal lugs 52; for simplicity, the drawings show only one shaft 50, bearing 50a and strip 51, i. e., only one side of the device. It will be understood that the axis of coil 53 is perpendicular to and passes through the axis of its shafts 50, and that coiled flexible leads 54 are provided to make connection with the winding 53.

A further stationary core or center section 55, also of laminated iron or steel, is located centrally in the circular opening 56 of the stator core 48, and is there supported by the non-magnetic clips 57. As this central core is cylindrical in shape, symmetrical, and coaxial with the shafts 50 of the rotor, there is no appreciable phase shift when the angular position of the rotor winding 53 is varied.

Figure 7 shows a system generally similar to Fig. 1, but including additional elements in combination, to provide for the manual secondary proportioning of a quantity which is also maintained automatically proportional to a master quantity.

Referring to Figure 7, it will be seen that the transmitting inductor rotor 65 is movable through a predetermined arc, say 30°, by the action of the follower arm 66 on a cam 67, which in turn is driven by the float 68 as it rises and falls with the movement of the liquid 69 in the weir box 70. The cam 67 may conveniently be of such contour as to convert the exponential movement of float 68 to a uniform angular movement of the rotor 65; in other words, so as to cause a movement of the inductor rotor suitable for producing voltage increments that are linear and correspond directly to the actual flow of the liquid 69 through the notch of the weir.

As in Fig. 1, an amplifier 71 is connected to supply energy to the opposed shading coils of the motor 72. A variable speed drive mechanism or gear box 73 (which can be of known construction) is arranged to be continuously driven by a separate electric motor 74. At the opposite end of the gear box is its variable speed output shaft 75, which, by means of the belt 76, drives the apparatus (not shown) for which proportional control is desired, e. g., chlorine feeding apparatus, a dry chemical feeder, or the like. A worm 77 and a worm gear 78 control the output speed of the variable speed drive mechanism 73, and are rotated by the reversible motor 72. Geared or otherwise connected to the same shaft as the worm 77 (or the gear 78) is the receiving inductor rotor 79, which is so wired (just as in Fig. 1) that its E. M. F. is opposite in phase to that of the transmitting inductor rotor 65.

From the foregoing and from the explanation of preceding figures, it will be seen that if the transmitting rotor 65 is displaced, the resulting unbalance will cause an E. M. F. to be applied to the input of the amplifier 71, which in turn will energize the shaded pole windings of the motor 72 and cause the receiving rotor 79 to be positioned at a point where its voltage, as proportioned by the "spread" potentiometer 80, is equal and opposite to that of the transmitter rotor, or some predetermined proportion thereof. At the same time, by virtue of the worm 77 and worm gear 78, the same operation of motor 72 causes the variable speed box 73 to vary the speed of its output shaft 75 in proportion to the change in flow of liquid as indicated by the extent and character of the voltage unbalance produced by the precedent displacement of the inductor rotor 65 at the weir box transmitter.

As explained in connection with Figure 1, the "spread" control potentiometer 80 permits matching the range of the variable speed drive (e. g., the receiving instrumentalities) to transmitter conditions. In Fig. 7, another potentiometer 81, with a calibrated dial 82, is connected across the circuit of the transmitting inductor 65, and so connected, serves the further and very valuable purpose of secondary proportioning or "dosage" control.

For example, let it be assumed that the belt 76 is arranged to drive a dry chemical feeding device (not shown) for treating a liquid in proportion to the rate of flow of the liquid as determined by the float 68 in the weir box. In many cases the amount of treating chemical required, say, per million gallons of the liquid being treated may be more or less at some times than at other times—for instance, where the need of the liquid for treatment varies with the time of day or the season of the year—yet of course the chemical feed must always be proportioned to the rate of flow of the liquid. The secondary proportioning or "dosage" control can be accomplished with the arrangement of Fig. 7 and without interrupting the general continuance of proportionality to rate of flow, since by the potentiometer device 81, 82, the effective voltage from the transmitting inductor rotor 65 is reduced to any proportional fraction thereof (from 100% to zero) in accordance with the setting of the readily calibrated dial 82 and the associated potentiometer arm. That is, by turning the dial 82 one way or the other, the reagent feeding apparatus (under control of the receiving instrumentalities) will be made to increase or decrease its rate of feed just as if there had been an increase or decrease, respectively, in the rate of flow of the liquid under treatment; while subsequent actual changes in the rate of flow will effect proportional change in the feeding of reagent as previously explained, at a rate of change determined by the setting of the potentiometer device 81—82.

Figure 7 thus illustrates a system for the automatic proportional control of a second quantity by a master or first quantity, with provisions for matching the receiving or controlling equipment to any particular transmitter condition or range, and for secondarily proportioning the transmitter output to permit "dosage" control.

In this and other illustrated embodiments of the invention, each of the various resistance devices, such as the spread and dosage control potentiometers in Fig. 7 or the spread potentiometer 12a and resistor 6a in Fig. 1, is preferably of very high resistance—for example, of the order of 200,000 ohms where the rotor output is of the order of 30 volts—and therefore absorbs such a small amount of energy from the inductor rotor as to cause substantially no electromagnetic reaction between the rotor and its stator. As previously explained, the amplifier input preferably draws no current from the rotors; on the other hand, potentiometer resistors connected across them necessarily draw some current, but if the resistance value is high, the flow of current is kept to such a small amount that no measurable reaction occurs—the effect being that of no current flow, and the condition is therefore conveniently so defined elsewhere herein and in the appended claims.

It will be understood that in the various systems shown in the drawings, the transmitting instrumentalities, such as the float-operated or other transmitters, may be located at a considerable distance from the controlled receiving elements, since the circuit of the inductor rotors is preferably free of appreciable current flow at all times and as the stator current is of a relatively small value because no appreciable wattage is required for energization of the rotors, the effect of line losses is minimized.

Figure 8 diagrammatically illustrates a multiple unit control system incorporating the features basically shown and described in connection with Figure 7, but providing for the simultaneous control of a plurality of devices which may differ in character.

As in preceding figures, the flow responsive transmitter 100 may, for example, be operated by a float 101 in a weir box. Since the movement of the float 101 is not directly proportional to the rate of flow, but has an exponential relationship thereto, a cam 102, is provided (like the cam 67 in Fig. 7) so that the follower arm 103 riding on its periphery will impart only such movement to the inductor rotor 104 as will produce changes in the output voltage of the rotor that are strictly proportional to the flow.

Compensation for sine law variations in rotor output is taken care of by this same cam 102. That is, particularly where secondary proportioning is employed as in the system of Figure 8 it is very desirable not merely that the angular displacement of the rotor be proportional to the rate of flow of the master fluid, but that the voltage output of the rotor, which is actually proportional to the sine of its angular position, be itself linearly proportional to the rate of flow. Although the sine law variation or aberration is relatively small for transmitter rotor positions from 0° (minimum or substantially zero voltage) to 30°, it is often difficult, particularly in laying-out and machine work, to make cams which will accurately compensate for the non-linearity of the float or like motion, at the lower end of the angular scale. Consequently, it is often desirable to operate the rotor through an angle substantially greater than 30° so as to reduce errors due to cam construction (as just explained), and especially in such cases, it is preferable to design the cam to compensate both for non-linear float movement and for non-linear (e. g., sine law) variation in the rotor output voltage. Furthermore, in making such cams, it is often practical, particularly for angular positions substantially greater than 0°, to take advantage of the non-linear voltage output of a rotor to compensate for or partially straighten out a non-linear transmitter motion, in a manner which will now be readily appreciated and understood in view of the fact that the rotor voltage is proportional to the sine of its angular position and its angular position may vary as an exponential function (with Venturi-controlled floats, the square) of the rate of flow.

In Figure 8, the transmitter rotor is arranged to control a plurality of receiving devices through a corresponding plurality of amplifiers 105 to 108 inclusive, each of the latter being adapted to energize its associated shading coil motor for balance-restoring displacement of the rotor of the corresponding receiving inductor. As will be seen, each amplifier is connected in series with its associated receiving inductor rotor, and the resulting receiving circuits, each of which may include spread control and dosage control potentiometers, are conveniently connected in parallel across the transmitter rotor 104.

As shown in the drawings, amplifier 108 is adapted to energize the indicator or recorder 109; amplifiers 106 and 107 respectively supply current to two control mechanisms which are shown diagrammatically in the boxes 110 and 111 and which, for example, may each control a separate chemical dry feeder (not shown); and amplifier 105 supplies energy to a control mechanism 112 which, for instance, may control a chlorinator or chlorine-feeding device (not shown).

Secondary proportioning or dosage control potentiometers 116, 117 and 118 for the control mechanisms 110, 111 and 112 respectively, are provided and connected as in Fig. 7, for purposes explained in connection with that figure. Ordinarily no dosage control potentiometer is needed for the indicator or recorder device 109, although one may be inserted if desired; indeed, the fixed resistor 119 shown in lieu of such potentiometer is not usually needed in a multiple-unit arrangement, although it is often desirable for best results when a single transmitter and recorder are employed, as previously explained in connection with Fig. 1.

Since it is usually preferable that the transmitter and receiver rotors, such as transmitter rotor 104 and receiver rotors 120 to 123 inclusive, be wound with many turns of fine wire to afford a relatively high output, it is also ordinarily preferable to use fairly high resistance both in the "dosage control" potentiometers 116 to 118, and in the "spread control" potentiometers 124 to 127 inclusive which are respectively connected across the receiver rotors 120 to 123. This is done to keep their parallel resistance as high as possible and therefore prevent appreciable electromagnetic reaction between the stator and rotor winding of each inductor. Values in the neighborhood of 200,000 ohms have been satisfactorily used for each of the potentiometers in this and other systems shown herein, and when the potentiometers are of the wire wound type they can be calibrated with especially high accuracy and permanence.

The recorder 109 advantageously has a cam 128 which is geared to the shaft of the reversible shading coil motor 129 and the indicator or pen arm 130. This cam 128 operates a follower arm 131 which in turn rotates the inductor rotor 120 in such a manner that even though the voltage of this receiving rotor 120 follows the law of sines, the variation or aberration is corrected by means of the cam so that the changes in voltage are arithmetically proportional to the movement indicated by the arm 130.

The dry feeder controllers 111 and 110 and the chlorinator controller 112 are not provided with cams in the system shown, since such correction as is necessary may be conveniently made in the feeding devices themselves (not shown), which are respectively controlled by the shafts 132, 133 and 134, to which both the reversible motors 111a, 110a and 112a and the receiving rotors 121, 122 and 123 are respectively connected. If desired, cams like cam 128 can be interposed between the shafts and the inductor rotors to afford any desired correction in cases where it is not obtainable by a mechanical means in the controlled device.

Individual switches 135 to 138 inclusive are provided in the A. C. lines to the motor field windings and amplifier power supply units, so that any one or more of the receiving control units can be made inoperative at will. A main switch 139 provides means for disconnecting the complete equipment from the A. C. supply line 140.

A matching transformer 141 is advantageously connected intermediate the line 140 and the several inductor stator windings 142 to 146 inclusive; since the secondary winding of the transformer can be readily designed to suit the number of inductors employed, it is possible to make all inductor stator windings alike, and to obtain a desirable match to the line 140 by means of the transformer 141. The transformer also serves as an insulating transformer to isolate the telemetering circuits from the power line.

All inductor stator windings 142 to 146 inclusive, are preferably placed in series so as to afford full temperature and voltage compensation (as explained in connection with Fig. 1) and to keep the phase relationships correct. Although the stator windings are usually made similar to each other, it is ordinarily preferable to have fewer turns of wire on the transmitting inductor rotor than on each of the receiving inductor rotors, so that the voltage output of the transmitter rotor is less than that of a receiving inductor rotor. Under such circumstances, the movement of the pen arm 130 or of the shafts 132, 133 and 134 can be either expanded or contracted by means of the spread control potentiometers 124 to 127 inclusive, as more fully explained in connection with Fig. 1.

The operation of the system shown in Figure 8 is generally the same as in preceding figures. Each movement of the float 101 results in change in the voltage value at the terminal of the transmitting rotor 104. The alternating E. M. F. produced by rotor 104 would tend to be impressed on the input of each of the amplifiers 105 to 108 inclusive, but in series with each amplifier input circuit is a receiving inductor rotor winding, such as rotor 120 (in series with the input of amplifier 108). Each such receiver rotor winding is so related to its respective stator winding that the E. M. F. which it produces is opposite in phase to the voltage produced by the transmitting inductor rotor—i. e., bucks the transmitter voltage.

The recorder 109 and the controller units 110 to 112 will therefore, in the manner previously explained herein, each take up a position such that the voltage of each individual receiving inductor rotor will just balance the transmitter rotor voltage, so that the indicator or recorder and feeding devices are each continuously controlled in accordance with the movements of float 101. Furthermore, the dosage control potentiometers are readily settable for separate variation of the rate of feed of each of the feeding devices; for instance, if the potentiometer 117 is turned to the 50% point on its calibrated dial, the controller 111 associated with it will take up a position that is exactly 50% of the transmitter position. That is, the receiving inductor rotor 121 is then only required to turn through half its normal angle to produce a voltage that will equal and counterbalance the reduced transmitter voltage which is obtained across the dosage control potentiometer 117.

Figure 9 diagrammatically illustrates a further modification of the systems heretofore described, wherein any number of receiving or "slave" devices can be proportionally controlled by any selected one of a plurality of transmitting or "master" devices.

Systems of this type are especially useful, for example, where two or more flow-responsive devices are desired—as for instance, where two or more Venturi meters are installed in parallel pipes so that in case of failure of one meter or any of its associated valves and other apparatus, the second meter can be immediately put into service. Sometimes, due to seasonal fluctuations in flow, it is necessary to have two mains installed, with accompanying Venturi meters, to handle the liquid under treatment; one of the meters being normally used and the other meter being employed when the demand increases beyond the capacity of the service unit.

For simplicity of illustration in Fig. 9, however, the controlling devices are floats of the type heretofore identified, since the system is satisfactorily applicable to that and many other types of controlling device. Likewise for simplicity of illustration, this figure shows only the transmitting and receiving inductive devices and certain directly associated instrumentalities, it being understood that other elements not shown, such as amplifiers and reversible motors, may be connected and operated as in preceding figures, for example Fig. 8.

Since in a number of cases, various circuits of the invention may be usefully employed with other than the variable inductor type of voltage sensitive element, Fig. 9 illustrates the use, for example, of transformers having fixed windings and having their voltage outputs varied by means of potentiometers actuated by the associated motor, float, or the like—it being understood, of course, that inductors such as shown in Figs. 2 to 6 may be used instead, in Fig. 9, and indeed are at present usually preferred in the several systems of the invention illustrated.

A plurality of receiving transformer devices are shown, respectively having primary windings 150 to 154 inclusive; and likewise a plurality of transmitting transformer devices are used, for example the two transformers having primary windings 155 and 156 respectively. Preferably, and like the inductor stators in other figures, and for the same reasons, all the primaries 150 to 156 inclusive are placed in series with each other and are excited by the secondary 157 of the matching transformer 158. Each of the receiving transformer secondaries 159 to 163 has across it a variable resistor or potentiometer, having a contact arm movable by the amplifier-controlled motor (not shown) so as to vary the voltage output of the resistors (designated 159a to 163a respectively), i. e., the voltage between the contact arm and one end of each resistor, in a manner similar to the receiving inductor rotors in preceding figures. Likewise the transmitting transformer secondaries 166 and 168 have associated variable resistors 166a and 168a respectively operated by the floats 167 and 169, for similarly producing a voltage output variable according to the float position in each case. It will be understood that "spread" and "dosage" control potentiometers can be used, as shown, intermediate the transmitting and receiving resistor-controlled transformer devices, just as in previous circuits wherein variable inductors are illustrated.

The receiving circuits comprising output resistors 159a to 163a of the receiving transformers, and each having associated "spread" and "dosage" control potentiometers 164 and 165, are respectively connected to the shiftable arms of the double pole, double throw switches 170 to 174 inclusive, as illustrated. The input circuits to the amplifiers (not shown) which are respectively connected in series in the receiving circuits, are indicated by the pairs of leads A to E inclusive. As will also be seen, the upper stationary contacts of the several double pole switches are connected in parallel across the output resistor 166a of the transmitting transformer controlled by the float 167, and the lower stationary contacts of the same switches are connected in parallel across the output resistor 168a of the transformer controlled by float 169.

It will now be apparent that by throwing any one or more of the DPDT switches 170–174 to the upper position, the corresponding receiving device or devices connected to such switch or switches will be caused to follow the command of the transmitter of float 167. Similarly such receiving devices as have their switches thrown to the lower position will be controlled by the transmitting device of the other float 169. It may also be explained that by opening any switch and leaving it in the open (or intermediate) position, the associated receiving device can be made to return to its zero or lowest position, since no transmitter voltage will then appear across the corresponding "dosage" control resistor 165.

It will be understood that the transmitting and receiving transformers in Fig. 9, when in use, have their secondary windings so connected that the instantaneous voltages are in opposition between the transmitting and receiving ends of the circuit respectively, just as in the case of the inductor rotors in preceding figures.

Figure 10 diagrammatically represents a further and very useful modification of the systems heretofore described, which automatically and effectively totalizes the readings of a group of transmitting units for control of a single receiving device such as the indicator 175. It will be understood that receiving devices for various types of control (such as feeder-controlling receivers, as well as indicators and recorders), or a group of receiving devices, can be substituted for the indicator 175, and their action made proportional to the joint signal obtained from two or more transmitting devices.

Referring to the figure, it will be noted that the stator windings 176, 177 and 178 of the three inductors in the transmitters 179, 180 and 181 respectively, are placed in series with each other and with the stator winding 182 of the inductor in the receiver 175, and all are energized from the A. C. line 183. The transmitting rotor windings 184, 185 and 186 are respectively connected across the resistance elements of the voltage dividers or potentiometers 187 to 189 inclusive, and the outputs of these potentiometers are connected in series with each other, in the proper, e. g. additive phase relationship, so that the resulting combined voltage will be opposite in phase (and in value, when the circuit is balanced) to the voltage derived from the "spread" control potentiometer 190 across the rotor winding 191 of the receiving inductor.

By a reduction in the number of turns of wire in the rotors 184–186 or by means of the voltage dividers 187–189, the voltage output (i. e. the output from the associated potentiometer) of each transmitter rotor when in its maximum position is made the same as each of the others and the sum of the output voltages is made equal to the opposing voltage obtained from the potentiometer 190 across the rotor 191 in the receiver 175. It will now be appreciated that any movement of any one or more of the group of transmitters will cause a voltage to appear across the input of the amplifier 192, so that the reversible motor 193 will be energized and the pen arm or pointer 194 of the receiver 175 will be compelled to assume a position indicative of the totalized positions of the multiple transmitter elements.

It will be noted that in the circuit shown, only three conductors are employed between the receiving and transmitting elements (and for one of those conductors ground may be substituted, if desired) by virtue of a simplex connection, which is useful in this and other systems of the invention, for example, when the distance separating the receiver and transmitter is very considerable or when available lines or wiring conduits are at a premium. To that end, center-tapped resistors or voltage dividers 201 and 202 are respectively connected across the ends of the line 203—204 of the stator circuit, and the rotor circuit between the transmitters and the receiver comprises the conductor 205 and the simplex circuit just described through resistors 201 and 202 (by virtue of conductors 206 and 207 to the center taps of the respective resistors).

Although under some conditions it is possible to dispense with compensating devices such as cam 195 in transmitter 179 and cam 196 in receiver 175, they are preferable in this system, particularly in the case of the transmitters. That is, since the positions of the inductor rotors in the various transmitters may provide any of a great number of combinations, it is very desirable that each inductor rotor voltage be directly proportional to the rate of flow or other basic controlling quantity, and not merely varied with the amount of movement of the float 197 or other driving means, which may have a non-linear relation to the basic quantity.

If uniform graduations are desired on the scale or chart of the receiver 175 the cam 196 may be used, as heretofore explained, to correct for the sine law variations in voltage output of the rotor 191 with angular displacement; or, a somewhat differently shaped cam can be used, instead, to amplify the scale of the receiver at any desired portion if extremely close readings are required throughout a particular range.

Figure 11 illustrates a somewhat modified arrangement of the simplexed type of connection shown in Figure 10. Here the receiver stator windings 212 and 213 and the transmitter stator winding 214 are each provided with a center tap, to afford the circuit division needed for simplexing the circuit of the rotors. It will be noted that for diversity of illustration, the stators in this figure are shown connected in parallel, a satisfactory arrangement in some cases, for example, where conditions of temperature and voltage are reasonably similar or constant at both the receiving and transmitting localities, so as to obviate a need for their compensation.

A further specific embodiment of the invention is diagrammatically shown in Figure 12, whereby a predetermined dosage program may be set up and automatically followed in a proportional control system, e. g., a chemical feeder or the like may be operated in proportion to the rate of flow of a fluid, but at predetermined different rates per unit quantity of fluid at various predetermined times.

For example, let it be assumed that a chlorinator is to be operated for application of chlorine gas to sewage which is constantly varying in quantity. For economy and other reasons, moreover, the variation in flow may not always be the sole determinative of the quantity of chlorine gas to be applied; that is, at different times there may be a variation in the amount of chlorine necessary per unit quantity of sewage, to effect a desired condition of sterility or the like. From an analysis of past performance, however, it is often possible to predict the quantity of chlorine needed per million gallons of sewage to maintain a desirable bacteriological condition, particularly in cases where the chlorine demand varies thru a daily cycle as the preponderance of wastes entering the sewer system changes from domestic to industrial and back again.

It is, therefore, frequently possible to achieve a material saving in chlorine if the dosage or percentage of chlorine added per given quantity of sewage treated is varied in accordance with the predicted demand. This can be done manually but more efficient results and greater savings, both in personnel and chemical costs, can be obtained by an automatic program device, such as is afforded in Fig. 12.

A small motor such as the synchronous clock motor 230 operated by suitably regulated alternating current from the line 231, rotates the minute and hour hands of a clock 232, and also rotates a cam 233 at a rate, say, of one revolution per hour. The cam 233 has a high-spot 234 on its periphery so positioned, for example, as to cause closure of a pair of contacts 235 for a brief period on the hour as indicated by the clock 232. Closure of contacts 235 effects energization of the stepping relay 236 for a short period of time; as a result, upon deenergization of the relay its ratchet wheel 236a is rotated a step, and likewise each of a plurality of selector switch arms 237, 238 and 239, mechanically operated by the ratchet wheel, is rotated to the next one of the series of contacts which each switch arm is arranged to traverse. In other words, the selector switches 237—239 progress one step per hour and as the number of stationary contacts 240 may advantageously correspond with the number of hours in the desired cycle—say twelve or twenty-four—a new group of circuits, as hereinafter described, are progressively connected each hour of the cycle.

A full wave copper oxide rectifier 241 is provided for supplying direct current to the relay 236 from the A. C. line 231, since more efficient and quieter operation of the stepping relay is usually possible from direct current; but if desired, the rectifier can be omitted and a suitable alternating current relay energized directly from the A. C. line.

A transmitter generally designated 242 comprises an inductor arranged to be operated in accordance with the flow of the fluid under treatment, and a receiving inductor 243 is provided to control the feeding rate of a chlorinator or other chemical feeding device (not shown) under the direction of the transmitter 242; a suitable motor (not shown) being provided for energization by amplifier 272 to actuate the rotor 246a and the chlorinator control, in the same manner, for instance, as in Fig. 1 or Fig. 7. Also as in previously described examples, the inductor stators 244 and 245 are preferably connected in series with each other and the line 231; and likewise a "spread" control potentiometer 246 is connected across the receiving inductor rotor 246a.

The rotor 247 of the transmitting inductor, instead of being connected merely to a single manually operated "dosage" control potentiometer for each receiver as in previously described systems, is arranged to be selectively connected to any one of a plurality of dosage potentiometers in accordance with the setting of the selector apparatus. Although for simplicity of illustration only four such potentiometers 248—251 (as well as a manually selectable alternative potentiometer 252) are shown in the drawings, it will be understood that additional potentiometers are provided and similarly connected, so that there is one for each hour in the total control cycle.

Through conductor 253, one side of the transmitter rotor 247 is connected to one side of each of the potentiometers 248 to 251 and of the additional potentiometers not shown. The other ends of the potentiometer resistors are respectively connected through conductors 254 to 257 inclusive, to successive stationary contacts on selector switch 258, and the potentiometer arms 261 to 264 inclusive are respectively connected through conductors 266 to 269 inclusive, to corresponding successive stationary contacts on selector switch 265; like terminals of the additional potentiometers (not shown) being similarly connected to the further contacts of the switches.

The movable center arm of selector switch 258 is connected through conductor 259, a pair of contacts in the operator's switch 289 (closed when the latter is in its left-hand or "automatic" position) and conductor 260, to the other side of transmitter rotor 247; and the arm of selector switch 265 is connected through conductor 270, another pair of contacts in the operator's switch 289 (similarly closed when the latter is in its left-hand position) and conductor 271 to one side of the input of amplifier 272, the other side of the amplifier input being connected to one side of "spread" control potentiometer 246, and the arm of the latter being connected through conductor 273a to conductor 253 and the common ends of the several dosage potentiometers.

It will now been seen that as the selector switches 258 and 265 are stepped around in unison, successive circuits identical with the circuit of Fig. 7 are set up, progressively including a different one of the dosage potentiometers 248, 249 and so forth, for each hour. Each of the dosage potentiometers is conveniently pre-set for the basic rate of feed desired for its hour; and the amplifier 272 is thus subjected to control, during each successive hour, by the opposed voltage outputs of the spread potentiometer 246 and the dosage potentiometer which is automatically selected for such hour, whereby the amplifier then effects the desired flow-responsive proportional control of the chlorinator in the manner characteristic of previously described circuits.

A plurality of pilot lamps are advantageously provided to indicate to the plant operator that the particular "dosage" control which is in circuit at the time is actually in synchronization with the clock 232. Although the drawings show only four such lamps 274 to 277 inclusive, respectively connected at one side by conductors 280 to 283 inclusive to successive contacts of selector switch 279, it will be understood that additional lamps may be included and similarly connected, corresponding to the dosage potentiometers, for each hour in the cycle. The other terminals of the lamps are connected to one side of the A. C. line 231, and the arm 237 of selector switch 279 is connected through conductor 286, a pair of contacts of switch 289 (closed when the switch is in its left-hand position) and conductor 285, to the other side of the line 231. Accordingly as the arm 237 steps around in unison with the arms 238 and 239, the pilot lamps are successively illuminated during successive hours of the cycle. If for any reason the stepping relay and its associated selector switches should get out of alignment with the clock 232, the condition will be indicated by operation of the wrong pilot light and can be readily corrected by intermittent manual operation of the reset contacts 287, which are connected in parallel with the cam contacts 235.

Under certain conditions it may be desirable to control manually the "dosage" of chlorine or other chemical, and to do so, the three-pole double throw switch 289 is thrown to its right-hand or "manual" position, from the left-hand automatic position which permits successive automatic connection of the instrumentalities controlled by the selector switches. In its right-hand position, the switch 289 continuously connects the manually controllable dosage potentiometer 252 in circuit in lieu of any of the potentiometers 248, 249 and so forth, and also connects the pilot lamp 290 across the line 231, to indicate this alternative condition of operation.

From the foregoing it will be seen that with the switch 289 at "automatic," a plant operator can, by proper manipulation of the "dosage" controls 248, 249, and so forth, set up any predetermined program and that this program will be automatically placed in effect by means of instrumentalities of the character shown and described.

The modification of the invention diagrammatically shown in Fig. 13 represents a system for the proportional application of chlorine or other chemical to a fluid, wherein the amount of chemical being added is made to depend not only on the flow of fluid as indicated by a device such as the Venturi meter 300 but also on the residual chlorine or other property of the fluid under treatment as indicated, for example, by a voltage obtained from a cell 309, which may be of the general type described in United States Patent No. 1,944,803, issued to George Ornstein on January 23, 1934 or in United States Patent No. 2,076,964 issued to Richard Pomeroy et al. on April 13, 1937.

A feeding device is provided—such, for example as a so-called vacuum type chlorinator 301, which may be of the kinds described in United States Patents Nos. 1,777,986 and 1,777,987, issued to Charles F. Wallace on October 7, 1930. The chlorinator 301 is adapted to discharge chlorine gas from the cylinder 304 through a pipe 302 to the main 303 which carries the water, sewage, or other fluid to be treated with chlorine. The amount of gas thus discharged to the main 303 is conveniently determined by the magnitude of the vacuum built up within a metering tube in the chlorinator as will be more fully understood by referring to the above-mentioned Wallace patents. The degree of vacuum can be controlled by various means, as for example by a so-called rate controller 305, which comprises a sealed reservoir 306 provided with a vertically adjustable tube 307 which may extend below the surface of liquid in the reservoir and which has its outer end open to the atmosphere.

The metering tube, not shown, of the chlorinator (wherein the vacuum is set up for control of the flow of chlorine gas) communicates with the pipe 308 which extends into the reservoir 306 but opens above the liquid in the latter, and therefore a vacuum will tend to exist both in the pipe 308 and in the upper part of the reservoir 306, where the pressure will consequently decrease to the point where air is drawn in through the adjustable tube 307. Consequently, for example, if the liquid in the reservoir 306 is water and the tube 307 has its inner end six inches below the surface, a vacuum equivalent to six inches of water will be established within the metering tube of the chlorinator and by virtue of the structure of the chlorinator as previously identified, will cause chlorine gas to be drawn through the orifice (not shown) in the metering tube and applied to the fluid in the main 303, at a corresponding predetermined rate.

From the foregoing, it will now be apparent that if the tube 307 is adjusted vertically—up or down, as necessary—through distances proportional to the square of the flow as indicated by the Venturi meter 300, the application of chlorine will be at a rate substantially proportional to the rate of flow through the main 303, it being understood that the chlorinator metering device is such as to require movements of the tube 307 proportional to the square of the flow in order to vary the chlorine feed in a direct proportion to variations of flow.

The cell 309, which as explained may be adapted to produce a voltage varying in accordance with the residual chlorine content of the liquid in the main 303 as treated by the chlorinator, is advantageously connected to a recording millivoltmeter 310 by means of suitable conductors represented by the line 311; and if desired, the voltage as indicated on this meter can be read directly in parts of chlorine per million gallons of water, or the like, by suitable calibration of the chart or scale of the meter. By mechanical connection to the millivoltmeter 310, the rotor 321, of a transmitting inductor 310a can be moved in accordance with variations in the voltage of cell 309. Since the ratio of cell voltage to residual chlorine may not be linear, cams or other compensating devices can be employed in a manner which will be readily understood, to provide a uniformly graduated scale and/or to impart a uniform motion to the rotor 321 of the inductor 310, or more particularly, so that the voltage produced by the rotor 321 will be directly and linearly proportional to the quantity of residual chlorine in the treated fluid, if such proportionality is desired.

The head-controlled float (not shown) in the Venturi meter 300, which may be of a satisfactory, known design, is advantageously arranged to effect mechanical displacement of the rotor 313 of a transmitting inductor 312, in accordance with flow-responsive variations in the position of the float. By suitable design of the float structure, in a manner which will be understood by those familiar with such devices, the motion which it imparts to the rotor 313 of the inductor 312 may be such as to produce a voltage in the rotor that will be directly proportional to the flow in the main 303, thereby facilitating the secondary proportioning hereinafter described.

The adjustable tube 307 of the rate controller 305 is mechanically connected to be driven up and down by means of the reversible motor 314, which has its shading coils connected for energization by amplifier 324 and which is also arranged to drive the rotor 316 of a receiving inductor for restoration of balance in the inductor rotor circuit, as in previously described systems of the invention. Although a simple, direct mechanical connection is diagrammatically indicated intermediate the motor 314, the tube 307 and rotor 316, it will be understood that in practice (because of the operative characteristics of the chlorinator metering device, as described above) a cam, system of levers or other suitable conversion means is preferably interposed between the motor and the inductor rotor 316, so as to cause a proper value of vacuum to be produced in the rate controller and in the chlorinator meter tube to produce a flow of gas through the metering orifice of the meter tube that is either directly proportional to the flow in the main 303, or directly proportional to the residual chlorine indicated by the cell 309, or directly proportional to conditions jointly indicated by both the cell and the Venturi meter, according to the setting of the composite potentiometer hereinafter described.

A group of voltage dividers or potentiometers are conveniently mounted on a control panel 317, and include a composite potentiometer 319 having two resistance elements 318 and 320, and a common contact arm adapted to traverse both. One resistance section 318 is so connected across the transmitting rotor 313 of the Venturi meter 300, and the other section 320 is so connected across the transmitting rotor 321 of the millivoltmeter-recorder 310, as shown, that adjustment of the common arm of the potentiometer 319 will cause the full voltage obtained from the rotor 313 or that obtained from the rotor 321 or any proportion or "mix" of both to be applied to the "dosage" control potentiometer 322, which has its resistor connected between one side of the rotor 313 and the opposite side of rotor 321. At the same time, as will now be appreciated, the composite or output voltage of potentiometer 319, i. e., across the resistor of dosage potentiometer 322, may advantageously never be greater than a predetermined maximum, say, the full voltage obtainable from either of the transmitting inductor rotors.

As in preceding circuits, a "spread" control potentiometer 323 is connected across the output of the receiving rotor 316 for the rate controller 305, and permits such contraction or expansion of its range as to fit any of a variety of specific transmitter installations.

The inductor stators 324 and 325 of the controlling or transmitting devices are connected in series with each other and in such phase relation that their instantaneous voltages will be additive. The inductor stator 326 of the controlled or receiving device is also placed in series with stators 324 and 325 but is so connected that its instantaneous voltage is opposite in phase. Operating power is supplied from the A. C. line 327 to the amplifier 324 and the millivoltmeter-recorder 310, by the conductors 328—329 and 330—331, respectively.

By virtue of connections functioning in the same manner as in previously described circuits, any difference in voltage that appears between the output of the dosage control potentiometer 322 and the spread control potentiometer 323 is applied to the input of the amplifier 324, and will thereby produce rotation of the motor 314 in such direction as to restore balance in the circuit and effect such corresponding change in the position of the tube 307 of the rate controller 305 as will modify the flow of chlorine gas in proportion to the change condition indicated by either or both of the transmitting elements 300 and 310.

Since in a number of cases, the fluctuation in fluid flow through a main 303 may be so rapid as to preclude control of the chlorinator 301 from a residual chlorine indicating cell 309 alone, it is often advantageous to use such a cell as a "trimmer" to correct for changes in the chlorine demand of the fluid due only to organic or other content, while variations in demand that are due to changes in flow, are controlled by the Venturi meter 300. From the preceding description of Fig. 13, it will now be appreciated that the circuits and instrumentalities there shown, are readily adapted to provide the operating conditions just mentioned, since by manipulation of the composite potentiometer or "ratio control" device 319, a compound system of this type can be easily adjusted or "tuned" to a point where hunting or fluctuating departure of the controlled elements from intended control positions is reduced to a desirable and satisfactory minimum.

In some cases, systems of the sort shown in Fig. 13 may be simplified in various respects, particularly where the secondary control exercised by the residual chlorine indicating cell is employed as a trimmer in the manner just explained. By way of example, Fig. 14 diagrammatically illustrates the basic elements of a simplified system of that character, like elements or instrumentalities being indicated by reference numbers similar to those in Fig. 13. Thus in Fig. 14, an amplifier 1324 furnishes suitably phased alternating current to the shading coils of the reversible motor 1314, which in turn mechanically actuates the receiving inductor rotor 1316, and the rate controller 1305.

A cell 1309 of the type, for instance, described in connection with Fig. 13 operates a recorder or other voltage-responsive device 1310, causing movements of its indicator or pen arm corresponding to variations in the E. M. F. of the cell. Movement of the pen arm mechanism in the device 1310 also operates the movable center arm of a potentiometer 1318 instead of the inductor rotor 1313 of Fig. 13. The Venturi transmitter 1312 includes the same instrumentalities as in Fig. 13, viz., the flow-responsive device 1300 and the transmitting inductor having rotor 1313.

The connections intermediate the transmitter 1312 and receiver 1315 being fundamentally similar to those in circuits previously described, it will be apparent that a movement of the Venturi-operated transmitted 1312 will cause a variation in the E. M. F. induced in the inductor rotor 1313, and that a voltage, as proportioned by the "dosage" control 1322 (and supplementary control 1318, as hereinafter described), will therefore be applied to the input of the amplifier 1324. This in turn causes movement of the receiving rotor 1316 to a point where its E. M. F. as proportioned by the "spread" control 1323 will be equal and opposite in value to that furnished by the transmitting instruments.

However, it will be noted that the additional potentiometer 1318 controlled by the voltmeter device 1310 and cell 1309 further proportions the output of the rotor 1313 in such a way that the chlorine-responsive cell in effect imparts a trimming or vernier control to the rate controller 1305 and thus cooperates with the flow-responsive transmitter 1312 to maintain a desired chemical or other condition in the fluid undergoing treatment, in accordance with its condition as well as its rate of flow. Furthermore, by means of a variable resistor 1318a, in series with the resistance element of potentiometer 1318, the magnitude of control exercised by the cell-responsive device 1310 can be modified at will to obtain optimum regulation, just as the composite transmitter arrangement in Fig. 13 can be adjusted or tuned for like purpose (as previously described) with the potentiometer 319 of that figure. It will be noted that conveniently, the resistance of potentiometer 1318 and the resistor 1318a are connected in series across the output of the dosage potentiometer 1322, and the adjustable output of devices 1318—1318a is connected in series with the amplifier input and the output of spread potentiometer 1323, to provide the described controls with the same essential transmitter-receiver connection as in the circuits of other figures.

It will be thus seen that Figs. 13 and 14 afford examples of systems embodying a type of secondary proportioning or "dosage" control which is automatically responsive to both the flow and the chemical or similarly detectable condition of the material under treatment, and systems wherein that automatic control can be modified in scope or relative extent, as desired.

Figure 15 illustrates a further modification of the invention, embodying certain additional features, including the operation of a multiple of controlled devices from a single amplifier instead of the provision of a separate amplifier for each controlled device as in the preceding figures; and also including instrumentalities whereby the rate of response of one or more controlled units to the variations indicated by the controlling device or controlling devices can be varied at will so as to interpose a desired delay and thereby reduce or prevent hunting. In the specific example of such system shown in Fig. 15, for purposes of illustration, a chemical feed apparatus is arranged to have a variable rate of response to the transmitter, of the character just mentioned, and at the same time a recording device operated from the transmitter is arranged to have a response that is substantially instantaneous with the variations of the transmitter.

Referring to Fig. 15: A transmitter or control means generally designated 354 is operated by fluid flow as in the case of the similar device 300 in Fig. 13. A chlorinator 353 applies chlorine gas to the flowing liquid that operates the transmitter 354, and the rate of chlorine application is varied by the rate controller 355 which operates in the manner previously described in connection with Figure 13. In addition, a fluid flow recorder 356 indicates the actual flow of the fluid under treatment, through the main (not shown). A single amplifier 357 supplies energy to the reversing windings, e. g. shading coils, of the servo-motors in both controlled devices.

In order to simplify the wiring diagram all leads connecting the inductor stators and the field windings of the servomotors have been omitted and their inter-connection to the power line 358 and each other indicated by letters A, B, and so forth—i. e. terminals bearing like letters being connected together. It will thus be seen that the inductor stator windings are all connected in series with each other to obtain temperature and voltage compensation, and furthermore, the motor fields are properly energized and phased for the desired co-action with them.

By means of the "dosage" control potentiometer 359 the ratio of gas feed to a given unit quantity of fluid can be varied to take care of any particular demand at the time of treatment; and by means of the similar secondary proportioning potentiometer 360 different recorder charts or scales can be matched to the transmitter—so that, for instance, a full scale movement of the recorder pen arm 361 can always be obtained from a transmitter 354 designed to handle, say, an ultimate maximum flow which may be twice the maximum flow through the main on some days.

As only a single amplifier 357 is employed for the dual operation of the two controlled devices it is desirable to apportion its operation between them, and a convenient arrangement for doing so comprises a cam 362 which may be driven by a motor 363 and which has associated contacts presently to be described.

When the cam follower or contact arm 365 is on the low spot or portion of the cam 362, as shown, the associated contacts 366 are open and a relay 367 connected with them is de-energized. Deenergization of the relay 367 permits its contacts 368 to remain open and disconnect the arm 369 of the "spread" control potentiometer 370 of the recorder 356 from the input terminal 373a of the amplifier 357. At the same time the other set of contacts 371 of the relay 367 are also open and thereby disconnect the shading coils 372 of the motor in the recorder 356 from the transformer secondary 373 of the amplifier. It will thus be apparent that no movement of the pen arm 361 of the recorder can take place during the period when the low spot of the cam 362 is opposite the follower arm 365, in the cycling mechanism.

But during the time that relay 367 is thus de-energized, the contacts 374 of the cam follower 375 are closed by the high spot of the cam 362, as shown, and if the dial 364, presently to be described, is set at maximum or 100% on its scale (so that contacts 351, in series with contacts 374, are kept closed), a relay 352, connected with contacts 374, will be continuously energized for the full period that the cam follower 375 is in contact with the high spot of the cam 362.

Energization of relay 352 causes closure of its contacts 376 which connect the arm 377 of the "spread" control potentiometer 378 of the feed-controlling receiver or rate controller 355 to the input terminal 373a of the amplifier 357. Energization of relay 352 also closes its contacts 379 and connects the shading coils 380 of the motor in the rate controller 355 to the transformer secondary 373 of the amplifier 357. Since one side of the output of each of the secondary proportioning devices 359 and 360 is continuously connected to the other amplifier input terminal 373b, and since the other output terminals of devices 359 and 360 are respectively connected to the fixed output terminals of "spread" potentiometers 378 and 370, it will now be seen that the chlorinator 353 will follow the transmitter 354 during the period of energization of relay 352, and conversely, when relay 367 is energized the recorder 356 will position its indicator or pan arm to agree with the flow measurement being transmitted during that period by the transmitter 354.

As mentioned hereinabove, the contacts 374 are also in series with the contacts 351 of an adjustable lag device. This device comprises a plate or support 382 that carries the contacts 351 and the follower arm 381 for operating them by means of a cam 350 which is conveniently rotated by motor 363 and hence synchronously with cam 362. The plate or support 382 is secured to and pivoted with a dial 364 and so braked by friction washers or like arrangement that it will remain in any angular position imparted to it by manual rotation of the dial 364. The cam 350 is preferably so cut, for example in a heart shape as shown, that the period or fraction of each revolution, during which it effects closure of contacts 351 by means of follower arm 381, is directly proportional to the angular position of the support 382 about its pivot; and the dial 364 for adjusting the support may then be uniformly calibrated in percentage of response.

For instance, when the plate 382 is in the angular position roughly indicated in the drawings, and the dial then reads, say 95% of its full scale value, contacts 351 remain closed for 95% of the time. It may be explained that the time of a complete revolution of cam 350 is preferably very small in comparison with the time required to effect an appreciable movement of the adjustable control tube 383 in the rate controller 355, so that the rapidly successive control intervals or impulses produced by operation of cam contacts 351 act cumulatively (and by reason of their intermittent nature, to slow down or decrease the rate of response of the system), instead of effecting substantial displacement of the receiver 355 during each such interval. Thus when the dial 364 is set at 95%, the rate of chlorinator response is slowed down to 95% of its maximum available value; or if the dial, for example, is set at its 5% position, the contacts 351 are closed only 5% of the time and the rate of chlorinator response is decreased correspondingly.

It will be understood that in the specific arrangement here shown, the rate of chlorinator response is also decreased by the operation of cam 362 and its associated contacts, and likewise the rate of response of the recorder 356 is decreased; the extent of decrease for each receiving device depending on the relative extent of the high and low spots on cam 362—if the latter are of equal length, for instance, the decrease is 50% in each case. It will be further appreciated that in the device shown, cam 362 is conveniently on the same shaft as cam 350, and rotates at a similarly rapid rate, for like reasons (although in some cases it may be desirable to rotate cam 350 at a greater speed than cam 362); and that the highest and lowest parts of cam 350 are so positioned relative to the high spot of cam 362, as to make the dial 364 truly indicate the percentage of response used for the chlorinator, relative to the maximum available rate of response under control of cam 362.

Thus the described arrangement permits selection of any desired reduction in the rate of chlorinator response, within a range dependent on the construction of the cycling mechanism as above explained. If in use, for instance, the flow of liquid through the main is so fluctuating that the receiver 355 tends to hunt badly, the dial 364 can be easily adjusted to slow down the rate of response until the hunting stops or is satisfactorily reduced.

Systems of the kind illustrated in Fig. 15, having a delay in the response of the controlled feeder, are of particular value, too, in cases where a recording or like instrument is controlled in accordance with such property of the treated substance as results from the treatment, and where the chemical treating device or the like is operated in response to the positioning of a transmitting inductor by the recording instrument—for instance, where a device like the recorder-transmitter 310 of Fig. 13, operated by a residual chlorine responsive cell, is used to control a device such as the receiver and chlorinator rate controller generally designated 355 in Fig. 15. In such cases, an appreciable time lag usually exists between application of the chemical and completion of its reaction, and the resulting tendency of the chemical feeder to hunt can be satisfactorily corrected with a system like that of Fig. 15, whereby the rate of feeder response can be slowed down as desired.

In the arrangement of Fig. 15, it is often desirable to operate the recording device 356 as continuously as possible, and to that end an auxiliary set of contacts 385 may be mounted on the support 382 as shown, being arranged to close whenever contacts 351 are open, and being connected through the switch 386 so that when the latter is closed, the contacts 385 serve to energize relay 367 (for operation of the recorder control) through contacts 374, at times when both the contacts 366 and 351 are open and neither of relays 352 and 362 would otherwise be energized. Thus when the switch 386 is closed, the periods of recorder operation are always at a maximum, i. e. last practically throughout each interval intermediate the periods of chlorinator control. It will be understood that other program or contact devices may be employed in systems like Fig. 15; for instance, another arrangement (not shown) to obtain the maximum recorder operation achieved with contacts 385 in the illustrated apparatus, may be provided by omitting cam 350, support 382 and its associated contacts, combining contacts 366 and 374 at one place so that contacts 374 are closed and 366 open only when the low spot of cam 362 passes that place, and providing cam 362 with a high spot adjustable in peripheral extent. However, such arrangement is generally less convenient than the illustrated structure wherein the contact device 382 and the heart-shaped cam 350 afford rapid adjustment (during operation), over a linear graduation on the dial 364.

In the specific embodiments of the invention previously described, the proportional application of chemicals or other substances has been shown as achieved through suitable metering means regulated only by devices responsive to the flow or other property of the substance undergoing treatment. Figure 16, however, shows a modified system of the invention, wherein the rate of application of chemicals or the like to the material undergoing treatment is kept proportional to the rate of flow of that material by continuously checking the actual passage or flow of each applied substance against the flow of the material being treated, and governing the rate of feed of each substance accordingly.

Referring to Figure 16, the fluid under treatment flows through the Venturi throat 399 in the conduit 400 in the direction indicated by the arrows, and as will now be readily understood, the resultant flow-responsive action of the Venturi meter 401 causes such angular displacement of the rotor 402 of the associated inductor 402a as to produce an alternating E. M. F. that is proportional to the rate of flow.

The circuit of the inductor rotor 402 extends, in series with the input of an amplifier 408, to the rotor 406 of another inductor 406a, in the same manner as previously described rotor circuits so that the output of the amplifier energizes the shading coils of a reversible servo-motor 409 and effects operation of the latter in accordance with such voltage unbalance as may exist between the rotors 402 and 406. The motor 409 is mechanically connected to operate the rate control of a reagent feeder—for example, a valve 410 or the like in the chemical supply line 431 through which the treating chemical passes to the conduit 400 from, say, a supply of such chemical fluid under pressure in the tank generally designated 426. Instead of being operated by the motor 409, the rotor 406 is connected for angular adjustment by the flow meter 407 which is operatively disposed relative to the orifice 432 in the supply line 431, so that, as will now be readily understood, the rotor 406 produces an alternating E. M. F. which opposes that of rotor 402 and which is proportional to the flow of treating fluid in the line 431.

It will now be seen that if, for example, there is a change in the rate of flow through the main 400, the resulting unbalance between rotors 402 and 406 will cause the motor-controlled feeding apparatus 409—410 to change the rate of chemical application accordingly, until the changing chemical flow, through the flow meter 407, readjusts the rotor 406 to a position of voltage balance with rotor 402, proportionality of feed to main fluid flow being thus again obtained. On the other hand, if for any reason the flow of chemical through line 431 should change independently of the operation of motor 409, the flow meter 407 will rotate the rotor 406 accordingly, unbalancing the rotor circuit and operating valve 410 in the manner previously described until the resulting chemical flow is restored to the desired proportionality to the flow through the main 400. That is, the change in chemical flow causes the flow meter to return the rotor 406 to its previous condition of voltage balance with rotor 402, whereupon the motor 409 is brought to rest.

Similarly connected with the rotor 402 of the master transmitting inductor 402a is the rotor 412 of another inductor 412a, in series with the input of an amplifier 414, whereby in accordance with any voltage unbalance between rotors 402 and 412, the motor 415 is operated to change the speed of the variable transmitter 416 (like that in Fig. 7), which in turn controls the feeding rate of another feeding device, such as the chemical dry feeder 417. The feeder 417 delivers dry chemical to an endless rotating belt 420 driven by a motor 421 and carried on the platform of the platform scale 413, so that the pointer 433 of the latter continuously registers the weight of the amount of chemical actually passing on the belt 320, and thus indicates the actual rate of chemical feed. From the belt 420, the dry chemical passes to a solution pot 418, where it is dissolved in suitable liquid which is then delivered to the main 400 by the pump 419, to effect the intended treatment.

The rotor 412 of inductor 412a is mechanically connected for rotative adjustment by the pointer 433 or other weight-responsive element of the scale 413, and it will now be appreciated that the instrumentalities just described (including amplifier 414, motor 415, feeder 417 and scale 413) afford a gravimetric feed of dry chemical in proportion to the flow of liquid through the main 400. That is, the motor 415 and chemical feeder 417 are controlled both by flow of liquid in main 400 and by check of the feed of chemical itself, in the same manner as the motor 409 and chemical feed controller 410 previously described—i. e., a voltage unbalance is produced for control of amplifier 414 upon angular displacement of either the flow-responsive rotor 402 or the chemical-feed-responsive rotor 412, and in every case balance is restored by further or return displacement of the latter in response to the desired change in chemical feed, when completed.

In order to provide a record, for example, of the amount of chemical fluid being discharged through the line 431 from container 426, a recorder unit 404 may be included. This unit comprises a servo-motor 429 for driving the pen arm 430 of the recorder, and an inductor 434 having its rotor 403 shiftable by the motor for restoration of balance as hereinafter described. Instead of employing a separate transmitter, such as a separate inductor operated by the flow meter 407, the rotor 403 and the input of its associated amplifier 405 (for energizing the shading coils of motor 429) are conveniently connected in series to the rotor 406 of inductor 406a, by conductors 427 and 428. It will now be seen that any change in the angular position of rotor 406 caused by change in chemical flow through the line 431 (in turn caused in any manner, as hereinabove explained) will establish a voltage unbalance in the circuit with the recorder receiving rotor 403, whereby the recorder pen arm 430 is shifted and the rotor 403 rotated to balancing position—and in consequence, the displacements of the recorder pen transversely of its time ordinate will be proportional to the flow of fluid through the supply line 431.

Although the circuits have been described in simplified form, it will be appreciated that various dosage control and spread or matching control potentiometers may advantageously be employed and connected (as shown) in the manner explained in connection with previously described figures; thus dosage control potentiometers 422 and 423 proportion the output of master transmitting rotor 402 for the fluid feeder and the dry chemical feeder respectively, while the spread control potentiometers 424, 425 and 435 are respectively associated with the receiving or supplementary control rotors 406, 412 and 403, for matching purposes.

It will be further understood that all of the inductor stators are preferably connected in series with each other and with the A. C. supply line (for reasons previously explained); for simplicity in the drawings, some of the conductors for the stators and for energization of other elements (such as motor windings) are omitted, and terminals to be connected together are indicated by the same letter, viz. A, B, C or D.

Figs. 17 to 17—F' inclusive illustrate and explain a further modification in the control systems of the invention, whereby a desired linear response to a non-linear variable is obtained—in this example, means whereby the angular follow-up displacement of a receiving inductor is proportional to the square root of the angular displacement of the associated transmitting inductor—without recourse to cams, levers, intermittent contacting devices or other types of conversion means usually employed for such purpose. One particularly advantageous use of such systems is in cases where control is desired in proportion to the flow of a fluid but where the most convenient type of device for operating the transmitting inductor is a device responsive to the head or pressure of the fluid (e. g., certain types of Venturi meters, and the like), which is proportional to the square of the flow.

Systems of the general type exemplified in these figures, when used, for instance, in connection with flow indicating or controlling devices, can be made to extract the square root of a quantity with an accuracy towards the zero end of the scale that will generally be comparable to, and sometimes greater than that obtainable with conventional cams and follower arms. In addition, the torque exerted on the operating and controlling instrumentalities is uniform, whereas with cams and their biased followers, or with levers, the torque necessary to overcome friction and to overcome the bias of the follower reaches a maximum at points adjacent the position of minimum or zero flow, and hence introduces an undesirable maximum amount of error at such points. For example in many such cases where but little transmitter torque is available, it is impossible to utilize readings at points below 10% of full meter scale, on account of the extreme rate of cam rise below that point.

In Fig. 17, a transmitting inductor 505 may have its rotor 506 arranged for displacement by a device (not shown) such as a float, Venturi meter or the like, as illustrated in previous figures. A receiving inductor 509 has its stator 510 preferably connected in series with the stator 507 of the transmitting inductor, and it will be understood that arrangements such as shown in previous figures may be employed to cause the receiving rotor 512 to follow-up, under the control of an amplifier 515 which has its input connected in series in the circuit intermediate the rotors 506 and 512. It will be noted that the output of the rotor 506 is proportioned by the potentiometer 508, and that there is also provided in the series circuit of the rotors, a supplemental stationary winding 511 at the receiving inductor; the outputs of the receiving rotor 512 and the supplemental winding 511 being respectively proportioned by the potentiometers 513 and 514.

The inductors may be those generally illustrated in Figs. 2 to 6 inclusive, but are preferably of the air-core type (e. g., like the device of Figs. 2 to 4 with the rotor of Fig. 4—B), carefully constructed so that when the rotor is in its zero position (i. e., with the axis of its winding at right angles to the axis of the stator winding) its voltage output is substantially zero or as close thereto as possible. Figs. 17—A and B and Figs. 17—C and D respectively show in section the windings of the transmitting and receiving inductors, each in two different positions as hereinafter explained. It will be noted that the supplementary winding 511 may conveniently surround (or be otherwise adjacent to) the stator winding 510, so that voltage is induced by the latter in the former just as in the rotor winding 512; and the supplementary winding 511 is wound in opposition to the rotor winding 512, or the series connection of the two windings is otherwise such, that they oppose or buck each other in voltage, i. e., so that the receiver output voltage in the rotor control circuit varies to a maximum when the receiver rotor is in zero position and to a minimum when the rotor is in the 90° or closest-coupled position.

It will be understood that the connections of the rotor circuit are such that the combined output of windings 511 and 512 opposes the electromotive force induced in transmitter rotor 506, and that the follow-up drive (not shown in this figure) under control of amplifier 515 is mechanically connected to rotate rotor 512 in a reverse direction to the displacement of rotor 506, to restore balance in accordance with the extent and phase relation of an unbalance caused by a displacement of rotor 506 (or of rotor 512, for example if this arrangement is used in the system of Fig. 16).

Let it be assumed, for example, that the maximum output of each of the transmitting and receiving rotors 506 and 512 is 100 volts, and that the E. M. F. produced by winding 511 is also 100 volts; this matching of the receiver windings to each other and to the transmitter rotor winding being obtained, if necessary, by suitable adjustment of the potentiometers 513 and 514 of the receiver windings. Now it has been found, for instance, that if the transmitter rotor is operated from 0° to 30° (see Figs. 17—C and 17—D, respectively), a convenient range to correspond with zero to maximum adjustment of the controlling device which is responsive to fluid head or the like, and if the potentiometer 508 is so adjusted that the receiving rotor 512 follows-up through a range correspondingly varying from 90° to 40° (see Figs. 17—A and 17—B respectively), the angular displacement of the receiving rotor is for all practical purposes directly proportionate to the square foot of the angular displacement of the transmitting rotor.

By way of explanation, it will be understood that the voltage output of rotor 512 is proportional to the sine of its angle R (Figs. 17—A and B) and the voltage output of rotor 506 is likewise proportional to the sine of its angle T (Figs. 17—C and D); and that the voltage output of receiver windings 512 and 511 combined in the manner hereinabove described, is proportional to the value of unity minus the sine of angle R, i. e., 1−sin R. As shown in the tabulation of Fig. 17—F, column 1 sets forth the values of angle R decreasing linearly in 2° steps from 90° to 40°, and columns 2 and 3 set forth the corresponding values of the sine of R and one minus the sine of R, respectively. Column 4 delineates the flow of fluid varying from zero to a maximum arbitrarily represented with the number 10.0, by increments equal to 0.4 of the thus selected unit of velocity. The corresponding variations in fluid head or pressure are set forth in column 5 (being the squares of the values in column 4), and likewise column 6 gives the variations in angle T of the transmitter rotor, increasing from 0° to 30° in direct proportion to the values in column 5, since the transmitter rotor is, by hypothesis, operated by direct mechanical connection from a device adjusted in accordance with the head of the fluid.

By reference to the last line of the table, it will be noted that when angle R equals 40°, one minus the sine of R is 0.3572, whereas the sine of 30°, the maximum value of angle T, is 0.5000. In consequence, the potentiometer 508 is adjusted until its output, which opposes the output of the receiving devices, is equal to $$\frac{0.3572}{0.5000} \times \sin T$$

By this adjustment, the receiving rotor 512 is made to assume its 40° position when the transmitting rotor 506 is in its 30° position, so that upon variation of rotor 506 to zero, the rotor 512 will vary to 90° as hereinabove described. Column 8 in the table sets forth the various values of the fractional function of the sine of R just mentioned, corresponding to the values of R in column 6; and simple comparison of columns 8 and 3 will now reveal the almost complete equality of their corresponding values, thus demonstrating that the receiving rotor moves in proportion to the square root of the displacements of the transmitter.

That is, say, as the flow of fluid increases linearly, the ultimate transmitted output voltage varies according to column 8 (which is in proportion to the square of the rate of flow), and yet when the receiving rotor is displaced to effect the production of an equal balancing voltage, in the manner previously described, the values of column 3 show that the stated displacement of the receiving rotor is necessarily proportioned to the linear series of angles in column 1, and thus to the flow, i. e. the square root of the quantity actually governing the transmitting inductor.

The described conversion is also shown graphically in Fig. 17—E, wherein the curve 500 represents the combined receiving rotor and bucking voltage (ordinates 502) plotted against angular positions of the receiving rotor, the voltage values being determined (note the parallel horizontal lines 504) by the equal balancing voltage of the transformer output (ordinates 503) which is plotted against transmitter rotor positions as the curve 501. It will be noted, by reference to any selected points of balance such as represented by lines 502—504—503, that the receiver rotor positions increase by substantially equal increments and are thus directly proportional to the rate of flow, whereas the corresponding controlling positions of the transmitter rotor increase in proportion to the square of the flow, i. e. to the head or pressure of the fluid concerned.

Referring again to Figs. 17 to 17—D, it may be explained that although for economy and the insurance of proper phase relations the bucking winding 511 is preferably part of the receiving inductor assembly, other means may in some cases be used to supply the bucking voltage. For example, a separate air core transformer, energized from the A. C. line, can have its secondary suitably connected in the rotor circuit in lieu of winding 511, for the same purpose; the primary of the transformer being conveniently connected in series with the inductor stators so as to obtain both voltage and temperature compensation.

It will be noted that with the system of Figure 17, the point of zero flow conveniently coincides with the point of zero inductor voltage. This feature is of considerable value, since by short circuiting or open circuiting the transmitting inductor circuit (e. g., the rotor 506) the receiver is caused to return to a point of zero reading on its scale. When the apparatus is used to control a gas flow recorder from a hydraulically operated chlorinator, the arrangement may be advantageously such that exhaustion of the gas supply will cause operation of a float switch to perform this operation (e. g., short circuit the transmitter rotor, either directly or by a relay), indicating that the machine no longer obtains chlorine and the gas flow therefore is at zero.

Figs. 18 to 18—F inclusive show a modified arrangement of the camless fluid flow meter instrumentalities described in connection with Figs. 17 to 17—F. Although the arrangement of the latter figures is now usually preferred, on some occasions it is desirable to have the auxiliary or supplemental stationary winding placed on the transmitting inductor, as for instance in cases where it is advantageous to drive the indicator or recorder pen arm mechanism, at the receiver, to a point beyond one of its normal end positions in order to operate alarm contacts or the like.

As will be apparent from the following description of the system of Figs. 18 to 18—F, this result can be automatically produced in that system by short-circuiting the transmitting inductor output (for example, with float-controlled contacts, not shown), and by or in consequence of the resulting movement of the receiver mechanism beyond its normal end position, a predetermined failure or abnormal condition at the transmitting end of the circuit can be indicated without the use of special control circuits or the like between transmitter and receiver.

The mode of illustration and of tabular and graphic explanation employed in Figs. 17 to 17—F is also followed in respectively corresponding Figs. 18 to 18—F. Referring to the latter, particularly Fig. 18, the receiving inductor 602, has a rotor winding 601 and a stator winding 600, the latter being conveniently connected in series with the stator winding 603 of the transmitting inductor 606, for reasons explained in connection with preceding figures. The transmitting inductor has a rotor 604; means are also provided for establishing a supplemental alternating E. M. F. in the rotor circuit at the transmitting station, and may be of the types described in connection with Figs. 17 to 17—F for the receiving station, preferably a supplemental stationary winding 605 surrounding the transmitter stator winding 603, as shown in Figs. 18—C and 18—D. Instead of opposing the voltage of the transmitter rotor 604, the supplemental winding 605 is in series additive connection with it; it will be noted that the outputs of these two windings are respectively proportioned by the potentiometers 608 and 607, and the voltage-adding connection just mentioned is made with the outputs of the potentiometers. As in preceding circuits, the output terminals of the transmitter and the output of rotor 601 (through the "spread" control potentiometer 601a) are connected in series, with the voltage of the respective devices in opposition, across the input of amplifier 620, so that any voltage unbalance due to movement of rotor 604 will, through instrumentalities (not here shown) of the types hereinabove described, cause the receiver rotor to follow-up as desired.

In the arrangement of Figs. 18 to 18—F, it is convenient to have the receiving rotor 601 operate through a range of 50°, e. g. from the position where angle R equals 90° (closest coupling) to the position where angle R equals 40°, as shown in Figs. 18—B and 18—A; and the zero point of the controlled recorder or like device is conveniently taken as corresponding to the 90° position of rotor 601. The voltage output of the receiver is therefore simply proportional to the sine of angle R, and as will be seen from column 2 of Fig. 18—F, decreases from a maximum, say 100 volts, to 0.64279 of the maximum, or approximately 64-28 volts, as the rotor moves down from 90° to 40° by equal steps.

The transmitting rotor 604 is advantageously operated through a range from the point where angle T equals 25° to the point where angle T equals 0°, i. e. to the point of zero or substantially zero coupling, and is advantageously connected for drive from the associated Venturi meter or other controlling device in such manner that the zero and maximum positions of the controlling device correspond respectively to the 25° and 0° positions of rotor 604. Assuming that the transmitting rotor 604 is thus displaced in proportion to the head or pressure of a flowing fluid, which is in turn proportional to the square of the rate of flow, the rotor output voltage will vary according to the sine of angle T, from 0.4226 of maximum to 0, as shown in column 6 of Fig. 18—F—or if the maximum rotor output is, say, 100 volts, the variation is from 42.26 volts at 25° to zero volts at 0°.

Since the 0° position (maximum on the control scale) of the transmitter rotor is to correspond with the 40° position of the receiver rotor where the voltage is 64.28 volts, the potentiometer 607 is so adjusted across the associated supplemental inductor winding 605 as to introduce from that winding, and into the rotor circuit, an E. M. F. of 64.28 volts, which is thus added to the transmitter rotor voltage at all positions. However, at the zero position of the control or head-responsive scale, which is the 25° position of transmitter rotor 604, the latter produces 42.26 volts whereas only 35.72 volts is needed in addition to the 64.28 volts derived from supplemental winding 605, in order that the receiving rotor 601 may establish balance in its corresponding 90° position (when it produces 100 volts). In consequence the potentiometer 608 across transmitting rotor 604 is so adjusted that the voltage thereby introduced in the circuit from rotor 604 is only 35.72 volts with the rotor in the 25° position, and varies proportionally from 25° to 0° as that fraction of the normal rotor voltage which is equal to 0.3572 divided by 0.4226.

In other words, the transmitter output voltage is determined by the following function proportional to the sine of the transmitter rotor angle T varying from 25° to 0° (and multiplied by 100 to obtain the actual voltage):

$$\frac{0.3572}{0.4226} \sin T + 0.6428$$

the corresponding values of this function being shown in column 7 of Fig. 18—F.

By comparison of columns 7 and 2 of Fig. 18—F (in the same manner as columns 8 and 3 of Fig. 17—F were previously compared), it will be seen that they are substantially alike and that as the transmitter rotor 604 moves from 25° to 0° in proportion to, say, the head of the fluid under measurements, the corresponding follow-up displacement of the receiver rotor 601 (to obtain voltage balance) will be substantially in accordance with the linearly decreasing angular values set forth in column 1 and thus in direct proportion to the linearly increasing values of rate of flow, in column 3.

In other words, the arrangements described are adapted to produce a displacement at the receiver which is substantially proportional to the square root of the quantity that directly controls the transmitter. This relation is also graphically shown in Fig. 18—E, comprising a pair of curves plotted in manner similar to Fig. 17—E. Curve 609 represents the voltage of the receiver rotor plotted against the angular positions assumed by that rotor on follow-up, and curve 610 represents the combined and proportioned output voltage of the transmitter, plotted against the angular positions of the transmitter rotor. Successive values of head and flow are set forth at the lower line of the respective graphs for transmitter and receiver, increasing in inverse relation to the angles; and by following the several sets of ordinates and parallel connecting lines 611—612—613, it will be noted that the receiver is moved linearly by equal increments, in direct proportion to the flow, although the transmitter is operated in proportion to the head of fluid, i. e. in proportion to the square of the rate of flow.

Although the angular ranges of transmitting and receiving rotors selected for illustration in Figs. 17 to 17—F and 18 to 18—F are notably effective ones to obtain the desired "square root" response, it will be understood the range of each instrument in either case may be varied considerably without substantial deviation from that type of response at all or most parts of the scale. For instance, variations inside the ranges stated have little effect except to decrease the useful extent of rotor displacement for most sensitive results, and transmitter rotor ranges may be increased or shifted upward, by a difference of the order of 10° or 20°, without serious impairment of the results in most cases; and likewise receiver rotor ranges may be similarly increased downward or shifted downward.

Referring again to Fig. 18, it will now be appreciated that if the output terminals of the transmitter (including devices 604, 605, 608, 607) are short-circuited, the resulting absence of transmitter voltage will cause the receiving rotor to be displayed beyond its normal maximum scale position, i. e. to an angular position below 40°, so as to facilitate the special controlling arrangements described hereinabove at the outset of the description of this figure.

In a number of cases, it is not necessary to use an inductor at the transmitting end of the systems exemplified in Figs. 17 to 17—F and 18 to 18—F, and Fig. 18—G shows potentiometer means which may be substituted, for instance, for inductor 606 and its associated potentiometer, in the circuit of Fig. 18. It will be understood that the elements in Fig. 18—G are to be connected according to the letters C, D, A, B to the correspondingly lettered points in Fig. 18, and the elements to the right of those points in Fig. 18 omitted.

Fig. 18—G shows a transformer, preferably of the air-core type if the receiving device is of that type, having a primary winding 614 to take the place of the transmitting inductor stator winding, and having a secondary winding 615 which is normally non-rotatable (although it may be shiftable for preliminary adjustment, if desired). The resistor 616 of a potentiometer and a biasing resistance 618 are connected in series across the secondary 615, and the output of these resistances—between the outer end 621 of resistance 618 and the arm 617 of the potentiometer—are connected in the transmitting end of the "rotor" or control circuit instead of the combined instrumentalities shown in Fig. 18.

Assuming, for example, that the operating conditions are to be otherwise the same as described in connection with Figs. 18 to 18—F and that the output voltage of secondary winding 615 is 100 volts, the values of resistors 616 and 618 are conveniently so chosen that the drop across the biassing resistor 618 is 64.28 volts, whereby at the lowest position of arm 617, the transmitter will be balanced by the receiver rotor in its 40° position. The potentiometer arm 617 is connected to be operated by the fluid head responsive device, so that as the arm is thereby moved from the upper to the lower end of resistance 616, the transmitter output voltage varies from 100 volts to 64.28 volts, in direct linear proportion to the head of liquid, and in proportion to the square of the flow. The resulting values of output voltage for successive control positions do not differ very substantially from the values set forth in column 7 of Fig. 18—F (there proportional to the sine of angles from 25° to 0°), and in view of the description of Figs. 18 to 18—F, it will now be seen that the follow-up displacement of the receiving rotor will be substantially proportional to the rate of fluid flow, i. e., to the square root of the quantity directly controlling the potentiometer arm 617.

In many cases, and without using modified arrangements such as shown in Figs. 17 to 18—G inclusive, at least a partial extraction of square root may be obtained with the control systems of the invention. For simplicity of explanation reference may be made to Fig. 1 or 7, say Fig. 1, wherein the head-responsive displacements of, say, a Venturi operated float (instead of the ilustrated weir box float 3) are arranged to control the indicator 11. The transmitting rotor 6, for example, may be made to operate through a range from 0° (zero coupling) to 30°, and if its maximum output E. M. F. is 100 volts, the values of output for successive angular positions will be as set forth in column 7 of Fig. 17—F—i. e., from zero to 50 volts, in proportion to the sine of the angle. The potentiometer 12a may then conveniently be adjusted so that its output is 50 volts when the receiving rotor 12 is in the 90° position (closest coupling), whereby the receiving rotor will operate through the full range from 0° to 90° as the transmitter moves from 0° to 30°; the receiver voltage output being at the same time proportional to the sine of its rotor angle.

The resulting control operation is shown graphically in Fig. 19, which represents a pair of curves 700 and 701 of receiver and transmitter rotor positions, respectively, plotted similarly to the curves in Figs. 17—E and 18—E. It will now be noted that whereas the transmitter rotor is moved in proportion to the head of the fluid, or to the square of its flow, the movements of the receiver rotor bear a far more nearly linear relation to the flow, in that the successive increments of rotor displacement which actually correspond to increments in rate of flow, are almost equal throughout the range. In some cases, this near equality will be sufficient for practical control purposes, so that cams or like devices (such as cam 15) may be dispensed with; in other cases, the partial extraction of square root obtained in the described manner, can be supplemented and completed by using a device such as cam 15, or a cam at the transmitter end as in Fig. 7, but having a much smaller amount of rise, particularly at the low end of the scale. Under such circumstances, the cam can be designed and machined with much greater accuracy than otherwise; its operation will be more accurate, and also more sensitive because the decrease in cam rise lowers the relative amount of torque required for operation of the cam follower.

It will be understood that in order to set up and operate apparatus as illustrated and described in connection with Figs. 17 to 19 inclusive, it is not ordinarily necessary to take precision voltmeter readings or the like, and the various voltage values have been mentioned, by way of example, for the principal purpose of illustrating the accuracy of conversion obtained with the described methods and apparatus. Thus in the usual practice of setting up, for instance, a recorder and transmitter in the field, it is only necessary to balance the recorder or controller at its zero or maximum position (by adjustment of the described potentiometers and the like), whereupon it is automatically conditioned to operate with the results represented in the tables and graphs shown.

It will now be appreciated that the control systems of the invention, particularly as exemplified in the several drawings, are not only efficient, accurate and sensitive, but are especially simple and reliable, so that they can be made at relatively low cost, and can be successfully installed and operated without the exercise of any extraordinary skill. The flexibility achieved by the arrangements and procedure described is of special importance; a wide variety of controlling and controlled devices, singly or in multiple, may be inter-connected and correlated to achieve a correspondingly wide variety of special results; and not only may the transmitting and receiving instrumentalities be located at greatly separated places, but various supplemental controls (such as manual or automatic "dosage" controls) may likewise be operated at or from remote points— points remote, if necessary, from the other apparatus. It will be appreciated that in substantial part these advantages are enhanced or facilitated by cooperation of the arrangements whereby, without sacrifice of sensitivity or accuracy, the voltage-controlled circuits are operated without substantial or appreciable flow of current; line losses are minimized, and undesirable reaction is prevented—an especially valuable feature in systems, for example those of Figs. 8, 9, 10, 13, 15 and 16 (and others), where a plurality of devices are inter-related for joint or simultaneous controlling action.

This application is a division of my copending application Serial No. 244,054, filed December 5, 1938, for Proportional control systems and procedure.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is desired to use the various features and elements in the combinations and relations described, some of these may be altered and others omitted and some of the features of each modification may be embodied in the others without interfering with the more general results outlined, and the invention extends to such use within the scope of the appended claims.

I claim:

1. In a proportional control system, in combination, an adjustable voltage producing device, a plurality of adjustable voltage producing devices each adapted to produce a voltage in opposition to the voltage of the first-mentioned device and each having voltage-responsive amplifying means connected in series with the input of the device and adapted to effect adjustment of the latter to maintain its voltage in balance with the voltage of the first-mentioned device, and means connecting said plurality of voltage devices, with their respective series-connected voltage responsive means, in parallel across the output of the first-mentioned voltage device.

2. The system of claim 1, wherein each of the voltage producing devices comprises inductive means having an energizing winding, and wherein said devices have means connecting the said windings in series for energization from a source of alternating current, to maintain the same current flow through all of said windings, and wherein each voltage-responsive means includes voltage-sensitive means adapted to respond to unbalance of the alternating electromotive forces established by said alternating current and respectively controlled by the controlling voltage device and the associated device to be controlled, without drawing current from the output of either device.

3. In a proportional control system, in combination, a plurality of adjustable voltage producing devices for control of the system, a plurality of adjustable voltage-producing devices each adapted to produce a voltage in opposition to the voltage of each of the first-mentioned devices and each having voltage-responsive means connected in series with the input of the device and adapted to effect adjustment of the latter to maintain its voltage in balance with the voltage of the first-mentioned device, and selective control means including switching devices for selectively connecting one, or in parallel more, of the second-mentioned voltage devices, each with its respective series-connected voltage responsive means, across the output of any one or another of the first-mentioned voltage devices, whereby each of the second-mentioned devices may be subjected to control from any selected one of the first-mentioned devices.

4. In a proportional control system, in combination, means for establishing opposed voltages, means at each of a plurality of stations for adjusting said first mentioned means to vary a corresponding one of the opposed voltages, means responsive to unbalance of said voltages for operating the adjusting means at one station to cause said first-mentioned means to balance the voltages, and means intermittently ringing said third-mentioned means under and out of control of said first-mentioned means, to inhibit rapid fluctuation of response at the station controlled by said third-mentioned means, said last mentioned means including means interrupting the operation of the adjusting means when the third-mentioned means is out of control of said first-mentioned means.

5. The system of claim 4, wherein the first mentioned means comprises a plurality of adjustable voltage producing devices, and wherein the third mentioned means includes an amplifier having an input adapted for connection with said devices, and wherein the intermittent means includes contact means controlled thereby for intermittently connecting and disconnecting the amplifier input relative to said devices.

6. In a proportional control system, in combination, an adjustable voltage-producing device, an amplifier, a plurality of other adjustable voltage-producing devices each adapted for connection in voltage opposition to said first mentioned device to control the amplifier upon unbalance of said voltage opposition and each having means adapted to be controlled by the amplifier upon such unbalance, to effect balance-restoring adjustment of the device, and control means for bringing said other devices into said controlling connection with the amplifier and bringing their balance-restoring means under control of the amplifier, individually at successive intervals.

7. In a proportional control system, in combination, means for establishing opposed alternating voltages respectively variable in accordance with positional variations at corresponding stations of the system, said means having means adjustable in angular position to vary the voltage output at one station in direct proportion to the sine of the angular position and voltage adjusting means at the other station positionally adjustable through a range in which the corresponding voltage output is substantially linearly proportional to positional variations, and means controlled by the first mentioned means and in response to voltage unbalance therein, for effecting positional adjustment of one of said adjusting means to restore balance, said first-mentioned means including means introducing additional alternating electromotive force in the control of said balancing means, to render the first-mentioned means susceptible of voltage balance throughout the aforesaid adjustment range of the second-mentioned adjusting means when the first-mentioned adjusting means is adjusted through a substantial range of angles not extending below about 40,° whereby proportional control intermediate the stations may be in substantial accordance with a quadratic function.

8. In a proportional control system, in combination, inductive means at each of two stations for establishing an alternating electromotive force, each of said inductive means having means adjustable in angular position to vary its output of electromotive force in direct proportion to the sine of the angular position, and means for associating the outputs of said inductive means in normally balanced opposed relation and for effecting balance-restoring operation of the adjusting means of one of said inductive means in response to unbalance of the electromotive forces, said last-mentioned means including a supplemental winding inductively associated with one of said inductive means and connected to introduce corresponding additional electromotive force into the opposed association of the outputs of the inductive means, whereby the latter may be brought into balance when one of them is adjusted through a range below about 3"° and the other through a range above about 35°, to provide a predetermined non-linear response to control variations.

9. In a proportional control system, in combination, a transmitting inductor device having a secondary winding and means for adjusting the voltage output thereof, a plurality of receiving inductor devices each having a secondary winding and means for adjusting the voltage output thereof, a corresponding plurality of amplifiers each having a voltage-sensitive input, each amplifier input being connected in series with a corresponding receiving inductor secondary and with the transmitting inductor secondary, for control of the amplifier without appreciable current drain from the secondaries, said transmitting secondary being thereby connected for normally balanced opposition of its voltage to that of each said receiving secondary, a corresponding plurality of means respectively controlled by the amplifiers for operating the respective adjusting means of the receiving inductor secondaries to restore voltage balance of each of same with the transmitting secondary, in response to any unbalance of the opposed voltages.

10. In a proportional control system, in combination, means for establishing opposed voltages at each of two stations respectively, means for adjusting said first-mentioned means in voltage at each station, control means normally adapted to maintain balance of said opposed voltages and including means controlled by said first mentioned means and responsive to a resultant of the opposed voltages upon unbalance thereof, for operating the adjusting means at one station to restore balance, said voltage establishing means at one station including inductive elements mutually displaceable in a path adapted to vary the induced voltage non-linearly in proportion to the displacement, and the adjusting means at the last-mentioned station comprising means for effecting said mutual displacement of said inductive elements, and said control means including voltage-modifying means associated with the voltage establishing means, for electrically correlating the respective ranges of voltage of said voltage-establishing means for the stations, to provide susceptibility of balance of the voltages throughout predetermined ranges of adjustment at the respective stations whereby the adjustment at one station is proportioned to a predetermined, non-linear function of the adjustment at the other station.

11. In a proportional control system, in combination, means for establishing normally balanced, opposed voltages and for adjusting one of said voltages in response to unbalance thereof caused by change of the other voltage, to restore balance, said first mentioned means comprising adjustable voltage control devices respectively at each of two stations, one of said control devices comprising a rotatable element for electrically controlling the voltage of the device whereby said voltage is electrically adjusted in accordance with a function of the sine of the angular position of said element, said element being rotatable through a range of angles of which the sine varies substantially non-linearly, and the other of said control devices comprising a voltage-varying element operable through a predetermined range wherein the voltage varies in a manner substantially different from the voltage variation of the first-mentioned device in the aforesaid range of angles of adjustment of the first-mentioned element, and each of said control devices having means for adjusting same, one of said adjusting means being connected for operation by the first-mentioned means to effect the aforesaid balance-restoring voltage adjustment, and said first-mentioned, voltage-establishing means including means electrically correlating and proportioning the voltage outputs of the control devices relative to each other for susceptibility of voltage balance through the aforesaid predetermined range of the second-mentioned element, and through a range of the first-mentioned element which includes its aforesaid range of angles having non-linear sine variation, to provide proportional control between the stations in substantial accordance with a quadratic function.

12. In a proportional control system, in combination, means at a controlling station for establishing an alternating voltage, separate means at each of at least two controlled stations for establishing an alternating voltage at the respective stations, each of said voltage establishing means being adjustable in voltage output without appreciable phase shift thereof, a plurality of voltage-responsive amplifying means respectively corresponding to the controlled stations and having associated means connecting the voltage-establishing means at said controlled stations in opposition to the voltage-establishing means at the controlling station for controlling the corresponding amplifying means, said last-mentioned means including means preventing appreciable current drain from any of the voltage-establishing means, and a plurality of means respectively controlled by the amplifying means and in response to voltage unbalance between the corresponding controlled and the controlling voltage-establishing means, for adjusting the corresponding controlled voltage-establishing means to restore balance.

13. In a proportional control system, in combination, a pair of means for separately establishing alternating voltages, each of said means including means for adjusting the voltage output thereof and being adapted for voltage adjustment thereby without appreciable phase shift, and at least one of said voltage-establishing means comprising inductive elements of which one is rotatably adjustable relative to the other for adjusting the voltage output in accordance with a function of the sine of the relative angular position of said elements, and the other of said voltage-establishing means being adapted to be adjusted in voltage output through a predetermined range wherein changes of voltage are substantially linearly proportional to operation of the corresponding adjusting means, control apparatus having a voltage-sensitive input adapted to respond to received voltage changes without drawing current from the source of received voltage; said voltage-establishing means being connected in normally balanced opposition and in series with the input of the control aparatus, and means controlled by said apparatus for adjusting one of said voltage-establishing means to restore balance upon unbalance of the opposed voltages resulting from adjustment of the other of said voltage-establishing means, said voltage-establishing means being correlated and proportioned in voltage output relative to each other, for susceptibility of voltage balance through the aforesaid linear range of the second-mentioned of said means and through a range of the first-mentioned of them wherein its aforesaid sine function response is at least in substantial part non-linear, whereby balance-restoring adjustments effected under control of the aforesaid apparatus follow-up the controlling unbalancing adjustments substantially in accordance with a quadratic function thereof.

14. In a proportional control system in combination, means for establishing normally balanced, opposed voltages and for adjusting one of said voltages in response to unbalance thereof caused by change of the other voltage, to restore balance, said first mentioned means comprising an adjustable voltage control device, at one of two stations, adapted to be adjusted, without appreciable phase shift, through a range producing substantially linear voltage response to adjustment of said device, an adjustable voltage control device at the other of the stations, including a rotatable element for electrically controlling the voltage of the device without appreciable phase shift and whereby said voltage is electrically adjusted in accordance with a function of the sine of the angular position of said element relative to a predetermined zero point, said element being adjustable through a range of angles extending to values substantially greater than 40°, and each of said control devices having means for adjusting same, one of said adjusting means being connected for operation by the first-mentioned means to effect the aforesaid balance-restoring voltage adjustment, and said first-mentioned means including means electrically correlating and proportioning said devices in voltage output relative to each other, for susceptibility of voltage balance through the aforesaid linear response range of the first-mentioned device and through an angular range of the said rotatable element not extending below about 40°.

15. In a proportional control system, in combination, means for establishig normally balanced, opposed voltages and for adjusting one of said voltages in response to unbalance thereof caused by change of the other voltage, to restore balance, said first mentioned means comprising inductive voltage control devices respectively corresponding to each of two stations, each of said devices including means rotatable to adjust the voltage of the device, without appreciable phase shift, for voltage response to the sine of the angular position of said rotatable means relative to a predetermined zero point, and each of said control devices having means for adjusting same, one of said adjusting means being connected for operation by the first mentioned means to effect the aforesaid balance-restoring voltage adjustment, and correlating means, connected to said devices and including means establishing a predetermined voltage in opposed association to one of the devices whereby the resultant voltage varies in proportion to unity minus the sine of the angular position of said one of the devices, said correlating means including means electrically proportioning the outputs of the devices and the last-mentioned predetermined voltage means, for susceptibility of voltage balance in the system through respective ranges of angular adjustment of about 0° to about 30° for said one of the devices and of about 90° to about 40° for the other of the devices.

JOHN R. MacKAY.